United States Patent
Lee et al.

(10) Patent No.: US 10,587,393 B2
(45) Date of Patent: Mar. 10, 2020

(54) METHOD FOR PERFORMING COMMUNICATION USING TDD FRAME IN WIRELESS COMMUNICATION SYSTEM, AND DEVICE THEREFOR

(71) Applicant: LG ELECTRONICS INC., Seoul (KR)

(72) Inventors: Hojae Lee, Seoul (KR); Sangrim Lee, Seoul (KR); Kwangseok Noh, Seoul (KR); Dongkyu Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 19 days.

(21) Appl. No.: 15/777,533

(22) PCT Filed: Apr. 19, 2016

(86) PCT No.: PCT/KR2016/004056
§ 371 (c)(1),
(2) Date: May 18, 2018

(87) PCT Pub. No.: WO2017/086554
PCT Pub. Date: May 26, 2017

(65) Prior Publication Data
US 2018/0331815 A1 Nov. 15, 2018

Related U.S. Application Data

(60) Provisional application No. 62/257,746, filed on Nov. 20, 2015.

(51) Int. Cl.
*H04L 5/14* (2006.01)
*H04L 27/26* (2006.01)
(Continued)

(52) U.S. Cl.
CPC .......... *H04L 5/1469* (2013.01); *H04L 5/0048* (2013.01); *H04L 5/0053* (2013.01);
(Continued)

(58) Field of Classification Search
None
See application file for complete search history.

(56) References Cited

U.S. PATENT DOCUMENTS

2010/0146289 A1* 6/2010 Kamakaris ............ H04L 9/0875
713/180
2012/0069778 A1* 3/2012 Zhang .................... H04L 5/14
370/279
(Continued)

FOREIGN PATENT DOCUMENTS

WO WO 2009/128643 A2 10/2009
WO WO 2013/162321 A2 10/2013
(Continued)

*Primary Examiner* — Bunjob Jaroenchonwanit
(74) *Attorney, Agent, or Firm* — Birch, Stewart, Kolasch & Birch, LLP

(57) ABSTRACT

A method for a terminal performing communication using a TDD frame in a wireless communication system may comprise the steps of: receiving a synchronization signal (SS) from one symbol of a first subframe of a TDD frame; and transmitting uplink control information via an uplink control zone comprising at least one last symbol in the first subframe.

11 Claims, 16 Drawing Sheets

(51) Int. Cl.
*H04W 56/00* (2009.01)
*H04L 5/00* (2006.01)
*H04L 25/02* (2006.01)
*H04W 72/12* (2009.01)
*H04W 72/04* (2009.01)

(52) U.S. Cl.
CPC ........ *H04L 5/1438* (2013.01); *H04L 25/0226* (2013.01); *H04L 27/2656* (2013.01); *H04L 27/2666* (2013.01); *H04L 27/2676* (2013.01); *H04W 56/00* (2013.01); *H04W 72/1289* (2013.01); *H04W 72/0446* (2013.01)

(56) References Cited

U.S. PATENT DOCUMENTS

| | | | |
|---|---|---|---|
| 2014/0185539 A1 | 7/2014 | Seo et al. | |
| 2015/0085795 A1* | 3/2015 | Papasakellariou | H04L 5/006 370/329 |
| 2015/0350944 A1* | 12/2015 | Chen | H04L 43/08 370/252 |
| 2016/0135143 A1* | 5/2016 | Won | H04W 72/005 370/312 |
| 2017/0055285 A1* | 2/2017 | Valliappan | H04W 74/085 |
| 2017/0063514 A1* | 3/2017 | Chen | H04L 5/14 |
| 2017/0063516 A1* | 3/2017 | Miao | H04L 5/14 |
| 2017/0289818 A1* | 10/2017 | Ng | H04W 48/12 |
| 2019/0158263 A1* | 5/2019 | Lee | H04L 5/0066 |

FOREIGN PATENT DOCUMENTS

| | | | |
|---|---|---|---|
| WO | WO 2014/069788 A1 | 5/2014 | |
| WO | WO 2015/119350 A1 | 8/2015 | |

\* cited by examiner

METHOD FOR PERFORMING COMMUNICATION USING TDD FRAME IN WIRELESS COMMUNICATION SYSTEM, AND DEVICE THEREFOR

CROSS REFERENCE TO RELATED APPLICATIONS

This application is the National Phase of PCT International Application No. PCT/KR2016/004056, filed on Apr. 19, 2016, which claims priority under 35 U.S.C. 119(e) to U.S. Provisional Application No. 62/257,746, filed on Nov. 20, 2015, which is hereby expressly incorporated by reference into the present application.

TECHNICAL FIELD

The present invention relates to a wireless communication system, and more particularly, to a method of performing communication using a TDD frame in a wireless communication system and apparatus therefore.

BACKGROUND ART

3GPP LTE (3rd Generation Partnership Project Long Term Evolution) system is designed with a frame structure having a TTI (transmission time interval) of 1 ms and data requirement latency time for a video application is 10 ms. Yet, with the advent of a new application such as real-time control and tactile internet, 5G technology in the future requires data transmission of lower latency and it is anticipated that 5G data requirement latency time is going to be lowered to 1 ms.

However, the legacy frame structure of 1 ms TTI is unable to satisfy the 1 ms data requirement latency. 5G aims to provide data latency reduced as much as 10 times compared to the legacy data latency.

To solve such a problem, a new frame structure has been required for the 5G communication system, but it has not been proposed so far.

DISCLOSURE OF THE INVENTION

Technical Tasks

A technical task of the present invention is to provide a method performed by a user equipment (UE) for performing communication using a TDD frame in a wireless communication system.

Another technical task of the present invention is to provide a UE for performing communication using a TDD frame in a wireless communication system.

It will be appreciated by persons skilled in the art that the technical tasks that could be achieved with the present invention are not limited to what has been particularly described hereinabove and other technical tasks that the present invention could achieve will be more clearly understood from the following detailed description.

Technical Solutions

To achieve the technical tasks, in an aspect of the present invention, provided herein is a method for performing communication using a time division duplex (TDD) frame by a user equipment (UE) in a wireless communication system, including: receiving a synchronization signal (SS) in one symbol of a first subframe of the TDD frame; and transmitting uplink control information through an uplink control zone including at least one last symbol in the first subframe. The method may further include receiving downlink control information in at least one start symbol excluding the one symbol within the first subframe. A symbol in front of the uplink control zone may be configured as a guard period. The method may further include receiving system information (SI) in the first symbol of each of one or more subframes subsequent to the first subframe. The first subframe may be the most preceding subframe of the TDD frame in a time domain. The SS may be received in a first symbol of the first subframe in the time domain. In the method, when downlink control information is received in a first symbol of the first subframe, the SS may be received in a second symbol of the first subframe. The method may further include receiving the SS in one symbol of a second subframe.

The method may further include: performing channel estimation based on the received SS; performing channel equalization based on the channel estimation; and blind detecting sequences applied to a reference signal (RS) in a symbol in which the SI is transmitted. The second subframe may be a subframe subsequent to the first subframe in a time domain. The one or more subframes subsequent to the first subframe may include four consecutive subframes.

In another aspect of the present invention, provided herein is a user equipment (UE) for performing communication using a time division duplex (TDD) frame in a wireless communication system, including: a receiver; a transmitter; a processor. In this case, the processor may be configured to: control the receiver to receive a synchronization signal (SS) in one symbol of a first subframe of the TDD frame and control the transmitter to transmit uplink control information in an uplink control zone including at least one last symbol in the first subframe. The processor may be configured to control the receiver to receive downlink control information in at least one start symbol excluding the one symbol within the first subframe. The processor may be configured to control the receiver to receive system information (SI) in a first symbol of each of one or more subframes subsequent to the first subframe. The processor may be configured to control the receiver to receive the SS in a first symbol of the first subframe.

Advantageous Effects

The downlink synchronization and SI transmission method based on the TDD new frame structure proposed in the present invention is advantageous in that system throughput loss can be minimized without deterioration of DL/UL flexibility of the self-contained frame structure.

In addition, the frame structure according to the proposal of the present invention can achieve low latency, which is one of the 5G service requirements, that is, the condition of OTA (Over The Air) (w/ initiation) <1 ms and at the same time, provide DL/UL flexibility capable of efficiently supporting asymmetry in UL/DL traffic.

It will be appreciated by persons skilled in the art that the effects that can be achieved through the present invention are not limited to what has been particularly described hereinabove and other advantages of the present invention will be more clearly understood from the following detailed description.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention.

BEST MODE FOR INVENTION

Figure 1:
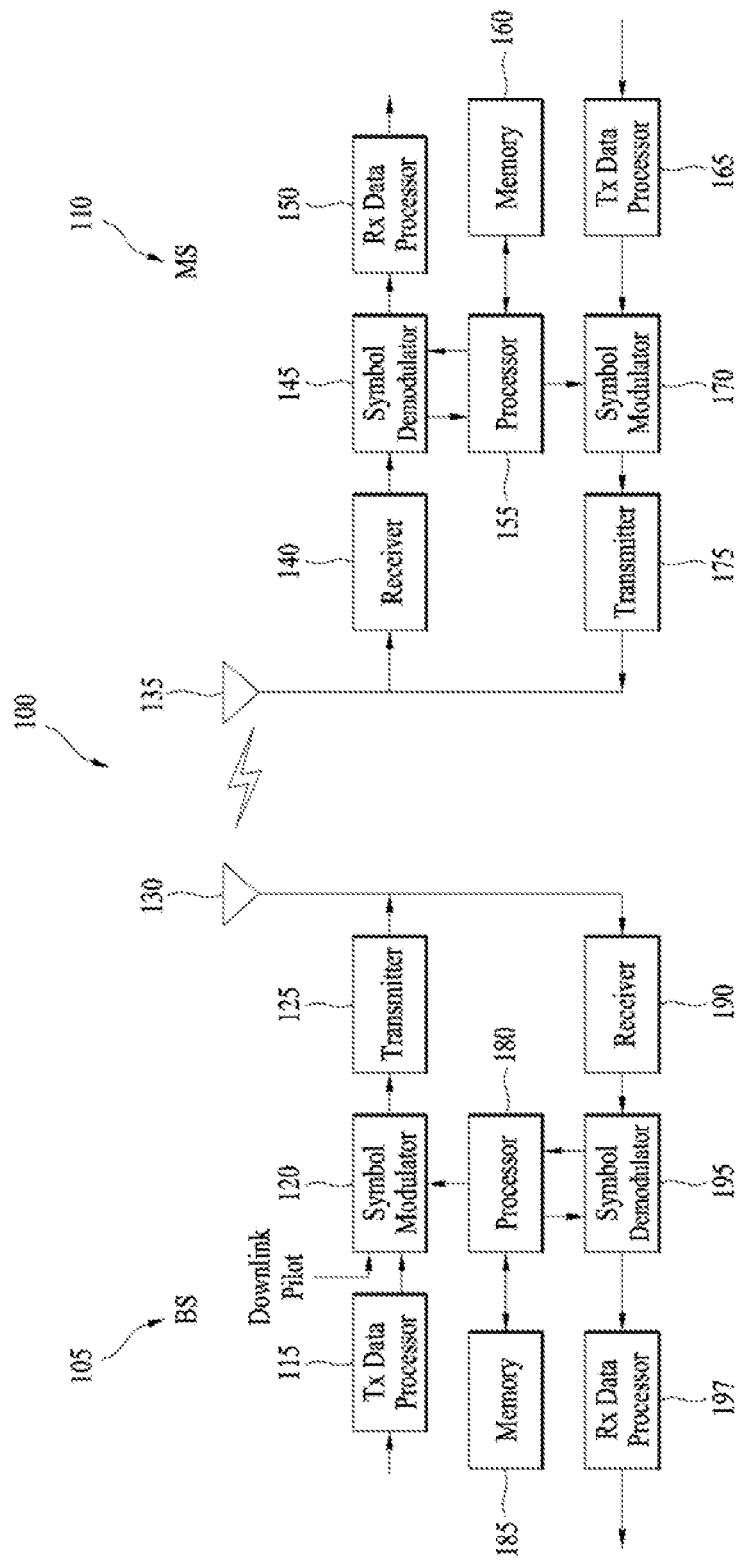
FIG. 1 is a block diagram for configurations of a base station 105 and a user equipment 110 in a wireless communication system 100.

Reference will now be made in detail to the preferred embodiments of the present invention, examples of which are illustrated in the accompanying drawings. In the following detailed description of the invention includes details to help the full understanding of the present invention. Yet, it is apparent to those skilled in the art that the present invention can be implemented without these details. For instance, although the following descriptions are made in detail on the assumption that a mobile communication system includes 3GPP LTE system, the following descriptions are applicable to other random mobile communication systems in a manner of excluding unique features of the 3GPP LTE.

Occasionally, to prevent the present invention from getting vaguer, structures and/or devices known to the public are skipped or can be represented as block diagrams centering on the core functions of the structures and/or devices. Wherever possible, the same reference numbers will be used throughout the drawings to refer to the same or like parts.

Besides, in the following description, assume that a terminal is a common name of such a mobile or fixed user stage device as a user equipment (UE), a mobile station (MS), an advanced mobile station (AMS) and the like. And, assume that a base station (BS) is a common name of such a random node of a network stage communicating with a terminal as a Node B (NB), an eNode B (eNB), an access point (AP) and the like. Although the present specification is described based on IEEE 802.16m system, contents of the present invention may be applicable to various kinds of other communication systems.

In a mobile communication system, a user equipment is able to receive information in downlink and is able to transmit information in uplink as well. Information transmitted or received by the user equipment node may include various kinds of data and control information. In accordance with types and usages of the information transmitted or received by the user equipment, various physical channels may exist.

The following descriptions are usable for various wireless access systems including CDMA (code division multiple access), FDMA (frequency division multiple access), TDMA (time division multiple access), OFDMA (orthogonal frequency division multiple access), SC-FDMA (single carrier frequency division multiple access) and the like. CDMA can be implemented by such a radio technology as UTRA (universal terrestrial radio access), CDMA 2000 and the like. TDMA can be implemented with such a radio technology as GSM/GPRS/EDGE (Global System for Mobile communications)/General Packet Radio Service/Enhanced Data Rates for GSM Evolution). OFDMA can be implemented with such a radio technology as IEEE 802.11 (Wi-Fi), IEEE 802.16 (WiMAX), IEEE 802.20, E-UTRA (Evolved UTRA), etc. UTRA is a part of UMTS (Universal Mobile Telecommunications System). 3GPP (3rd Generation Partnership Project) LTE (long term evolution) is a part of E-UMTS (Evolved UMTS) that uses E-UTRA. The 3GPP LTE employs OFDMA in DL and SC-FDMA in UL. And, LTE-A (LTE-Advanced) is an evolved version of 3GPP LTE.

Moreover, in the following description, specific terminologies are provided to help the understanding of the present invention. And, the use of the specific terminology can be modified into another form within the scope of the technical idea of the present invention.

In case of performing wireless transmission between a base station and a UE, a transmission to the UE from the base station is commonly referred to as a DL transmission and a transmission to the base station from the UE is commonly referred to as a UL transmission. A scheme of determining a radio resource between the DL transmission and the UL transmission is defined as duplex. When a frequency band is divided into a DL transmission band and a UL transmission band and transmission and reception are performed in both directions, it is referred to as frequency division duplex (FDD).

FIG. 1 is a block diagram for configurations of a base station 105 and a user equipment 110 in a wireless communication system 100.

Although one base station 105 and one user equipment 110 (D2D user equipment included) are shown in the drawing to schematically represent a wireless communication system 100, the wireless communication system 100 may include at least one base station and/or at least one user equipment.

Referring to FIG. 1, a base station 105 may include a transmitted (Tx) data processor 115, a symbol modulator 120, a transmitter 125, a transceiving antenna 130, a processor 180, a memory 185, a receiver 190, a symbol demodulator 195 and a received data processor 197. And, a user equipment 110 may include a transmitted (Tx) data processor 165, a symbol modulator 170, a transmitter 175, a transceiving antenna 135, a processor 155, a memory 160, a receiver 140, a symbol demodulator 155 and a received data processor 150. Although the base station/user equipment 105/110 includes one antenna 130/135 in the drawing, each of the base station 105 and the user equipment 110 includes a plurality of antennas. Therefore, each of the base station 105 and the user equipment 110 of the present invention supports an MIMO (multiple input multiple output) system. And, the base station 105 according to the present invention may support both SU-MIMO (single user-MIMO) and MU-MIMO (multi user-MIMO) systems.

In downlink, the transmission data processor 115 receives traffic data, codes the received traffic data by formatting the received traffic data, interleaves the coded traffic data, modulates (or symbol maps) the interleaved data, and then provides modulated symbols (data symbols). The symbol modulator 120 provides a stream of symbols by receiving and processing the data symbols and pilot symbols.

The symbol modulator 120 multiplexes the data and pilot symbols together and then transmits the multiplexed symbols to the transmitter 125. In doing so, each of the transmitted symbols may include the data symbol, the pilot symbol or a signal value of zero. In each symbol duration, pilot symbols may be contiguously transmitted. In doing so, the pilot symbols may include symbols of frequency division multiplexing (FDM), orthogonal frequency division multiplexing (OFDM), or code division multiplexing (CDM).

The transmitter 125 receives the stream of the symbols, converts the received stream to at least one or more analog signals, additionally adjusts the analog signals (e.g., amplification, filtering, frequency upconverting), and then generates a downlink signal suitable for a transmission on a radio channel. Subsequently, the downlink signal is transmitted to the user equipment via the antenna 130.

In the configuration of the user equipment 110, the receiving antenna 135 receives the downlink signal from the base station and then provides the received signal to the receiver 140. The receiver 140 adjusts the received signal (e.g., filtering, amplification and frequency downconverting), digitizes the adjusted signal, and then obtains samples. The symbol demodulator 145 demodulates the received pilot symbols and then provides them to the processor 155 for channel estimation.

The symbol demodulator 145 receives a frequency response estimated value for downlink from the processor 155, performs data demodulation on the received data symbols, obtains data symbol estimated values (i.e., estimated values of the transmitted data symbols), and then provides the data symbols estimated values to the received (Rx) data processor 150. The received data processor 150 reconstructs the transmitted traffic data by performing demodulation (i.e., symbol demapping, deinterleaving and decoding) on the data symbol estimated values.

The processing by the symbol demodulator 145 and the processing by the received data processor 150 are complementary to the processing by the symbol modulator 120 and the processing by the transmission data processor 115 in the base station 105, respectively.

In the user equipment 110 in uplink, the transmission data processor 165 processes the traffic data and then provides data symbols. The symbol modulator 170 receives the data symbols, multiplexes the received data symbols, performs modulation on the multiplexed symbols, and then provides a stream of the symbols to the transmitter 175. The transmitter 175 receives the stream of the symbols, processes the received stream, and generates an uplink signal. This uplink signal is then transmitted to the base station 105 via the antenna 135.

In the base station 105, the uplink signal is received from the user equipment 110 via the antenna 130. The receiver 190 processes the received uplink signal and then obtains samples. Subsequently, the symbol demodulator 195 processes the samples and then provides pilot symbols received in uplink and a data symbol estimated value. The received data processor 197 processes the data symbol estimated value and then reconstructs the traffic data transmitted from the user equipment 110.

The processor 155/180 of the user equipment/base station 110/105 directs operations (e.g., control, adjustment, management, etc.) of the user equipment/base station 110/105. The processor 155/180 may be connected to the memory unit 160/185 configured to store program codes and data. The memory 160/185 is connected to the processor 155/180 to store operating systems, applications and general files.

The processor 155/180 may be called one of a controller, a microcontroller, a microprocessor, a microcomputer and the like. And, the processor 155/180 may be implemented using hardware, firmware, software and/or any combinations thereof. In the implementation by hardware, the processor 155/180 may be provided with such a device configured to implement the present invention as ASICs (application specific integrated circuits), DSPs (digital signal processors), DSPDs (digital signal processing devices), PLDs (programmable logic devices), FPGAs (field programmable gate arrays), and the like.

Meanwhile, in case of implementing the embodiments of the present invention using firmware or software, the firmware or software may be configured to include modules, procedures, and/or functions for performing the above-explained functions or operations of the present invention. And, the firmware or software configured to implement the present invention is loaded in the processor 155/180 or saved in the memory 160/185 to be driven by the processor 155/180.

Layers of a radio protocol between a user equipment/base station and a wireless communication system (network) may be classified into 1st layer L1, 2nd layer L2 and 3rd layer L3 based on 3 lower layers of OSI (open system interconnection) model well known to communication systems. A physical layer belongs to the 1st layer and provides an information transfer service via a physical channel. RRC (radio resource control) layer belongs to the 3rd layer and provides control radio resourced between UE and network. A user equipment and a base station may be able to exchange RRC messages with each other through a wireless communication network and RRC layers.

In the present specification, although the processor 155/180 of the user equipment/base station performs an operation of processing signals and data except a function for the user equipment/base station 110/105 to receive or transmit a signal, for clarity, the processors 155 and 180 will not be mentioned in the following description specifically. In the following description, the processor 155/180 can be regarded as performing a series of operations such as a data processing and the like except a function of receiving or transmitting a signal without being specially mentioned.

The present invention proposes new and various frame structures for a 5$^{th}$ generation (5G) communication system. In a next generation 5G system, scenarios can be classified into Enhanced Mobile BroadBand (eMBB), Ultra-reliable Machine-Type Communications (uMTC), Massive Machine-Type Communications (mMTC), and the like. The eMBB corresponds to a next generation mobile communication scenario having such a characteristic as high spectrum efficiency, high user experienced data rate, high peak data rate, and the like, the uMTC corresponds to a next generation mobile communication scenario having such a characteristic as ultra-reliable, ultra-low latency, ultra-high availability, and the like (e.g., V2X, Emergency Service, Remote Control), and the mMTC corresponds to a next generation mobile communication scenario having such a characteristic as low cost, low energy, short packet, and massive connectivity (e.g., IoT).

Figure 2:
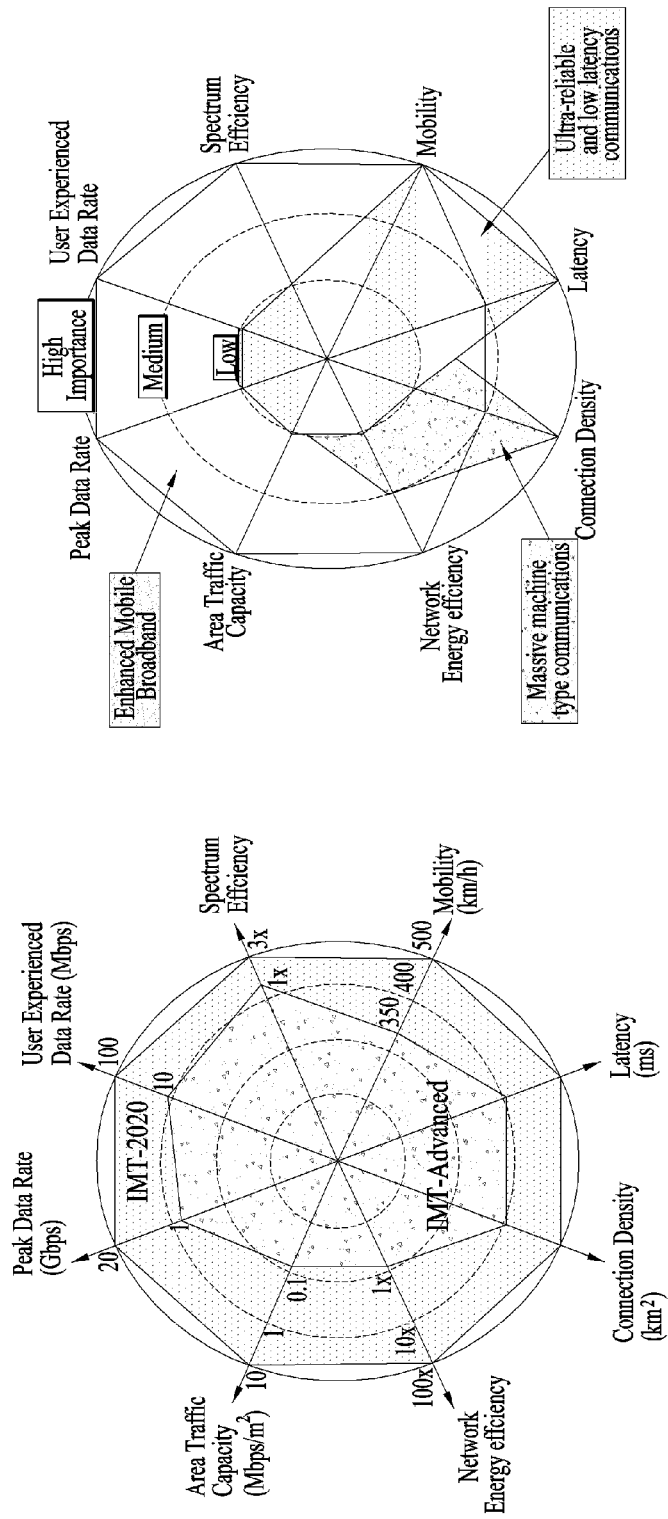
FIG. 2 is a diagram for explaining correlation between IMT 2020 core performance requirement for 5G and 5G performance requirement per service scenario.

FIG. 2 is a diagram for explaining correlation between IMT 2020 core performance requirement for 5G and 5G performance requirement per service scenario.

FIG. 2 illustrates correlation between core performance requirement for 5G proposed by IMT 2020 and 5G performance requirement per service scenario.

In particular, uMTC service has very high restriction on Over The Air (OTA) Latency Requirement and requires high mobility and high reliability (OTA Latency: <1 ms, Mobility: >500 km/h, BLER: <10$^{-6}$).

Figure 3:
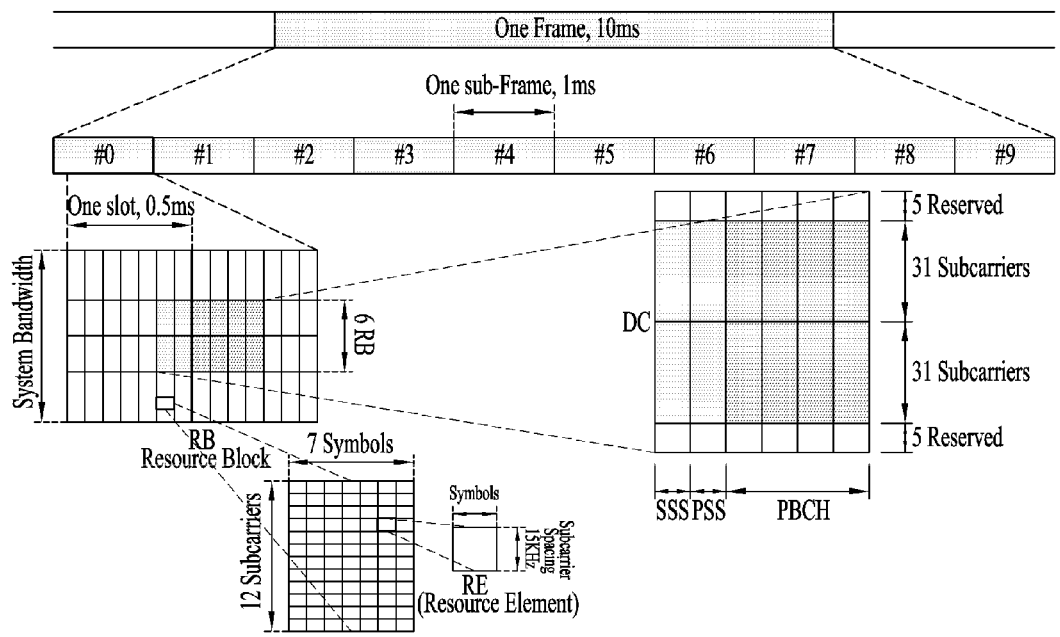
FIG. 3 is a diagram for LTE/LTE-A frame structure.

FIG. 3 is a diagram for LTE/LTE-A frame structure.

FIG. 3 shows a basic concept of a frame structure of LTE/LTE-A. One frame corresponds to 10 ms and includes 10 1-ms subframes. One subframe includes 2 0.5-ms slots and one slot includes 7 OFDM (Orthogonal Frequency Division Multiplexing) symbols. One resource block (RB) is defined by 12 subcarriers each of which has 15 kHz space and 7 OFDM symbols. A base station delivers a primary synchronization signal (PSS) and a secondary synchronization signal (SSS) for synchronization a physical broadcast channel (PBCH) for system information in a center frequency (6RBs). In this case, it may have a difference in the frame structure and positions of the signal and the channel depending on a normal/extended CP (cyclic prefix) and TDD (Time Division Duplex)/FDD (Frequency Division Duplex).

Figure 4:
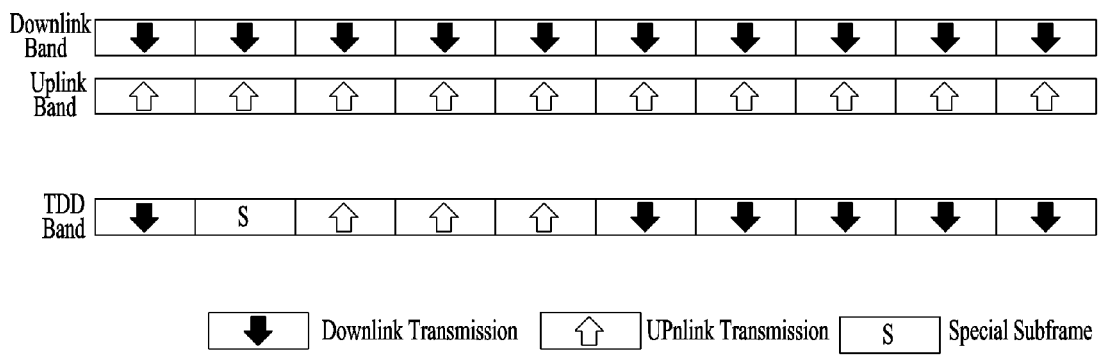
FIG. 4 is a diagram for an example of FDD/TDD frame structure in LTE/LTE-A system.

FIG. 4 is a diagram for an example of FDD/TDD frame structure in LTE/LTE-A system.

Referring to FIG. 4, in case of a FDD frame structure, a downlink frequency band is distinguished from an uplink frequency band. In case of a TDD frame structure, a downlink region is distinguished from an uplink region in a subframe unit in the same band.

Figure 5:
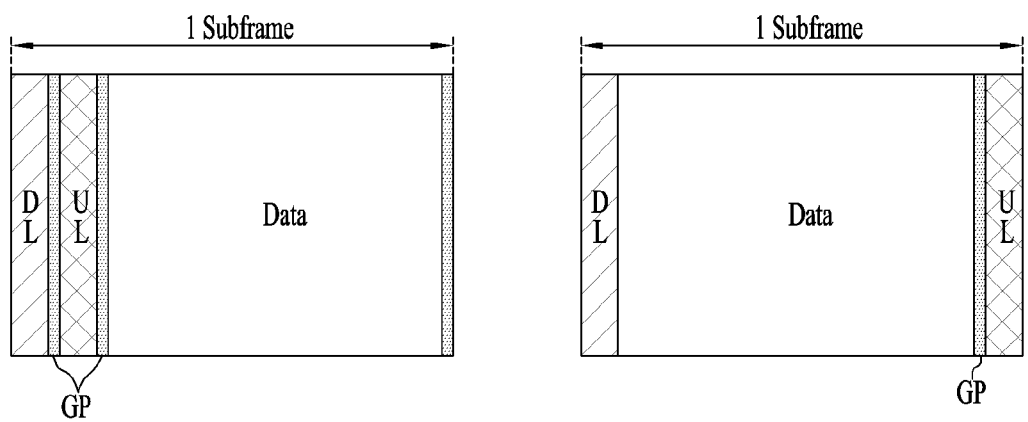
FIG. 5 is a diagram for an example of a self-contained subframe structure.

FIG. 5 is a diagram for an example of a self-contained subframe structure.

FIG. 5 illustrates a self-contained subframe structure which is proposed to satisfy a low-latency requirement among 5G performance requirements. A TDD-based self-contained subframe structure has a resource section for downlink, a resource section for uplink (e.g., a downlink control channel and an uplink control channel), a guard period (GP) for solving an interference issue between downlink and uplink, and a resource section for data transmission in a single subframe.

FIG. 5(a) shows an example of a self-contained subframe structure. A subframe is configured in an order of a resource section for downlink, a resource section for uplink, and a resource section for data and a GP exists between the resource sections. In FIG. 5(a), a downlink resource section represented as DL may correspond to a resource section for a downlink control channel and an uplink resource section represented as UL may correspond to a resource section for an uplink control channel.

FIG. 5(b) shows a different example of a self-contained subframe structure. A subframe is configured in an order of a resource section for downlink, a resource section for data, and a resource section for uplink and a GP exists prior to the resource section for uplink only. In FIG. 5(b), a downlink resource section represented as DL may correspond to a resource section for a downlink control channel and an uplink resource section represented as UL may correspond to a resource section for an uplink control channel.

The next generation 5G system is considering V2X targeting ultra-low latency, eMBB service targeting emergency service, machine control, and data speed, and the like. Hence, it is necessary to design a frame structure capable of supporting low latency (OTA<1 ms) and high degree of freedom of DL/UL data. And, it is necessary to design a commonality-based single frame structure which is not necessary to be redesigned in TDD or FDD operation scheme.

In order to provide the low latency and the degree of freedom of DL/UL data configuration in the next generation 5G system, the present invention proposes a method of configuring a new frame structure and a control zone. In the present specification, such a term as a zone indicates a resource. Such a terms as a region, a channel, and the like can be used together with the zone in the same meaning.

Proposal 1: New Frame Structure (Adaptive/Self-Contained Frame Structure) for 5G Systems It is difficult to satisfy a requirement of OTA<1 ms in a current LTE/LTE-A TDD frame structure. And, although TDD scheme provides various TDD DL/UL configurations to efficiently support asymmetry (DL traffic>UL traffic) of DL/UL data amount, it causes a complex procedure for HARQ (hybrid automatic repeat request) ACK/NACK time depending on a TDD DL/UL configuration. In order to solve the problem, as shown in FIG. 5, self-contained frame structures provide an opportunity for transmitting ACK/NACK in every subframe by simultaneously configuring a DL control zone (or, a DL control channel, a DL control region) and an UL control zone in a single subframe.

Figure 6:
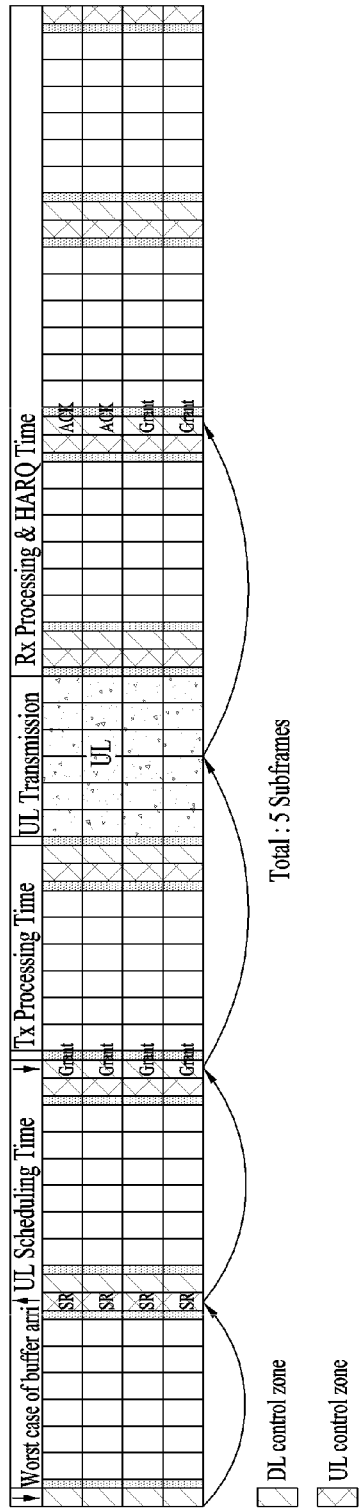
FIG. 6 is a diagram for a HARQ procedure when a UL resource of a data zone is immediately allocated.

FIG. 6 is a diagram for a HARQ procedure when a UL resource of a data zone is immediately allocated.

When a data zone is always guaranteed as an UL data zone or a DL data zone (or, DL data region) based on the subframe structure shown in FIG. 5(b), it may be able to perform a HARQ procedure within 5 subframes between OTA (w/initiation), i.e., UL buffer arrival, and final ACK/NACK reception.

FIG. 6 illustrates an example that HARQ ACK is received within 5 subframes. A corresponding procedure is described in the following. Subframe #1: if a data to be transmitted in UL is generated and a buffer arrival event is triggered, a UE transmits a scheduling request (SR) using an UL control zone. A subframe #2 corresponds to time for performing UL scheduling. A subframe #3 corresponds to a DL control zone. The UE receives a UL grant and prepares data to be transmitted in the subframe #3. The UE transmits UL data via a data zone in a subframe #4. A subframe #5 corresponds to time for a base station to receive data and perform Rx processing. The UE receives ACK via a DL control channel in a subframe #6.

According to the abovementioned procedure, from the timing at which the buffer arrival event occurred to the timing at which the ACK is received, it is able to see that the procedure occurs within 5 subframes. Hence, if TTI is configured by 0.2 ms, 'OTA (w/initiation) <1 ms' is satisfied. However, since a data zone is restricted to a UL data zone or a DL data zone in a single subframe, if DL (or UL) traffic considerably occurs, as shown in FIG. 7, it is apparent that a case of failing to transmit DL (or UL) traffic occurs.

Figure 7:
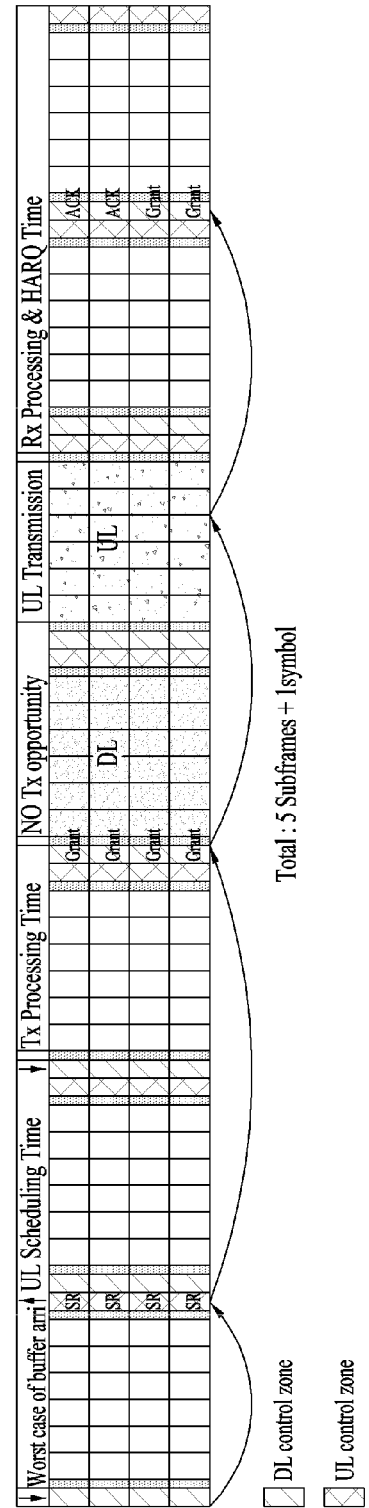
FIG. 7 is a diagram for a HARQ procedure when a UL resource of a data zone is not immediately allocated.

FIG. 7 is a diagram for a HARQ procedure when a UL resource of a data zone is not immediately allocated.

As shown in FIG. 7, if it fails to perform scheduling on UL data due to DL traffic for other UEs in a fourth subframe form the left side, latency as much as 1 subframe occurs and it is unable to satisfy 'OTA (w/initiation) <1 ms'. Moreover, if it is necessary to transmit more DL traffic, the latency is going to be extended. In particular, in order to achieve not only asymmetry of DL/UL traffic amount but also low latency, it is necessary to guarantee the degree of freedom of DL/UL traffic as much as possible in a data zone.

The present invention proposes a new frame structure capable of satisfying low latency and DL/UL data flexibility on the basis of a single carrier.

Proposal 1-1

Figure 8:
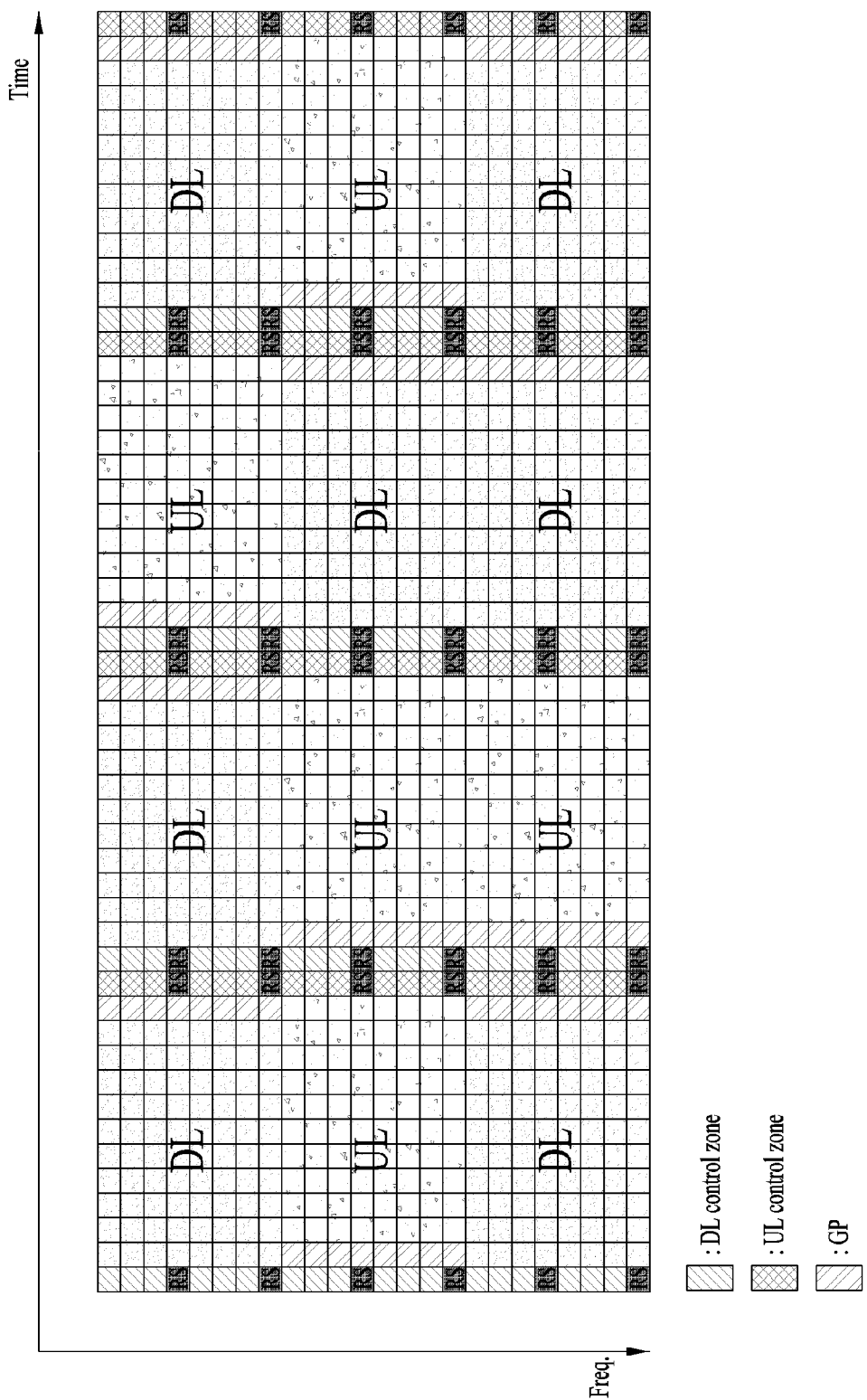
FIG. 8 is a diagram for a new frame structure according to a proposal 1-1 of the present invention.

FIG. 8 is a diagram for a new frame structure according to a proposal 1-1 of the present invention.

As shown in FIG. 8, a subframe is mainly divided into a DL control zone (or DL control channel), a GP, a data zone (data region or data channel), and a UL control zone (or UL control channel) on a single carrier. A frame structure shown in FIG. 8 corresponds to a frame structure which is configured under the assumption that a base station operates in a full duplex radio (FDR) scheme. Meanwhile, the frame structure shown in FIG. 8 may correspond to a frame structure allocated by a base station for a single UE. For example, if the frame structure shown in FIG. 8 corresponds to a frame structure allocated by a base station for a single UE, a DL data zone, a UL data zone, and a UL data zone are allocated to the UE according to a band in frequency domain direction in a first subframe shown in FIG. 8. In this case, the UE receives DL data from the base station on a band represented by DL and transmits UL data to the base station on a band represented by UL. In particular, the frame structure shown in FIG. 8 may correspond to a frame structure allocated to the UE under the assumption that the UE is able to operate in the FDR as well.

In FIG. 8, the DL data zone and the UL data zone, which are allocated according to a band in a subframe, can be differently configured according to a subframe. For example, referring to FIG. 8, a DL data zone, a UL data zone, and a UL data zone can be allocated according to a band in frequency domain direction in a second subframe.

As shown in FIG. 8, a DL control zone is located at the first (start) of a subframe in time domain, a data zone (a zone represented by DL, UL) is located right after the DL control zone, and a UL control zone is lastly located after the data zone. In this case, the data zone can be used as a DL data or a UL data in frequency domain without any restriction. And, a GP is located between the DL control zone and the data zone when data belonging to a corresponding band corresponds to UL. On the contrary, when data corresponds to DL, a GP is located between the data zone and the UL control zone.

As shown in FIG. 8, a UL transmission occasion and a DL transmission occasion exist at the same time in a data zone in every subframe. In particular, it is able to prevent additional latency due to the restriction of a legacy data zone restricted to DL or UL. If a length of a subframe is configured to be equal to or less than 0.2 ms, it is able to achieve 'OTA (w/initiation) <1 ms'.

Moreover, a base station may have more efficiency via DL/UL flexibility of the data zone in the aspect of utilizing DL/UL data resource compared to a legacy self-contained TDD frame structure. Hence, the frame structure shown in FIG. 8 is able to get rid of inefficiency due to the asymmetry of DL/UL traffic and achieve low latency.

Embodiment of Proposal 1-1

Embodiment for a method of achieving low latency and an operating method when DL data transmission timing is overlapped with UL data transmission timing are described in the following.

Figure 9:
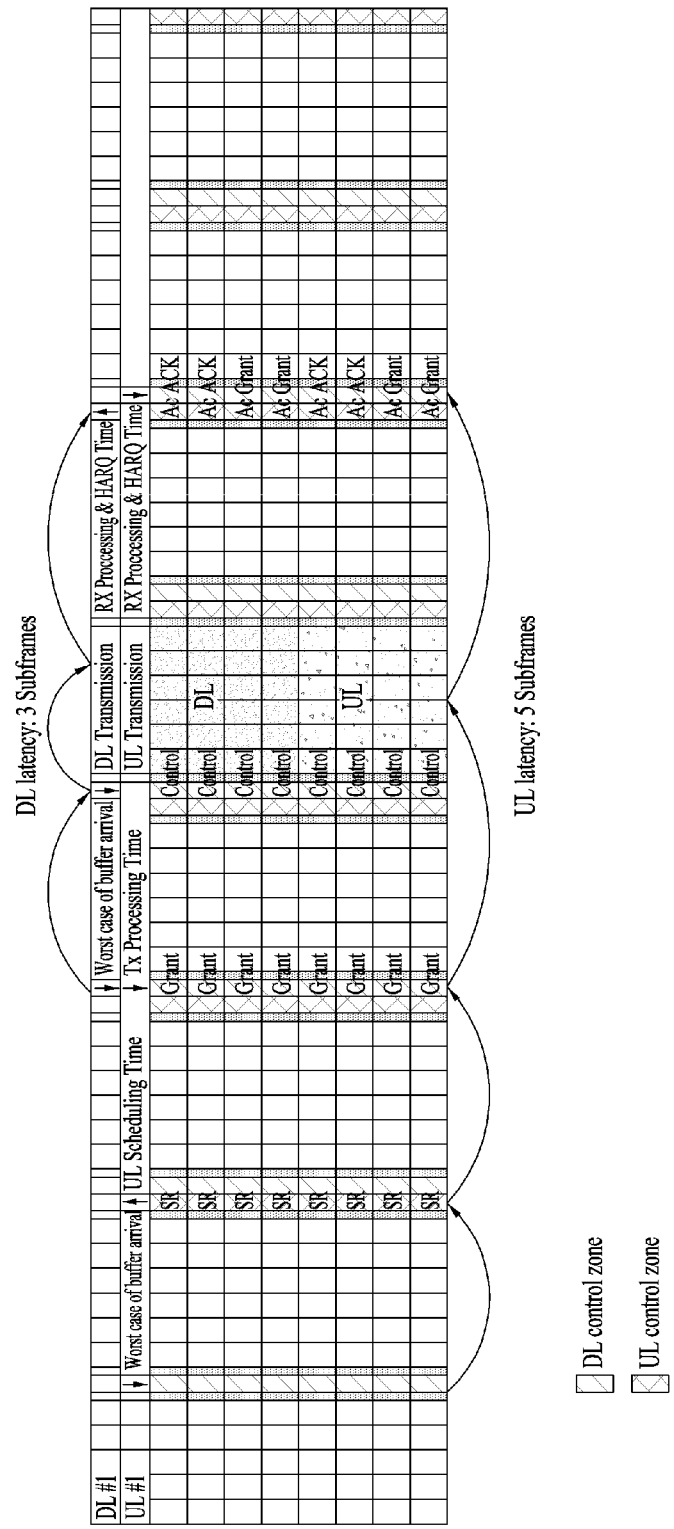
FIG. 9 is a diagram for explaining a case that DL transmission timing is overlapped with UL transmission timing.

FIG. 9 is a diagram for explaining a case that DL transmission timing is overlapped with UL transmission timing.

As shown in FIG. 9, when a DL buffer arrival event and a DL buffer arrival event respectively occur, one of the two buffer arrival events has no choice but to be delayed in a legacy frame structure. In FIG. 9, it is assumed that 2 traffics (DL traffic and UL traffic) are overlapped. If more traffic occurs at the same time, more latency may occur.

On the other hand, referring to a frame structure shown in FIG. 9, since a DL data zone and a UL data zone are allocated within a subframe, it is able to transmit DL data and UL data at the same time and simultaneous transmission is also supported while minimum latency is maintained. The frame structure shown in FIG. 9 has a merit in that a gain increases according to the increase of traffic.

Proposal 1-2

A DL control zone and a UL control zone can be configured by 1 to N number of symbols. A GP is configured by an integer multiple of a symbol. More specifically, a length of a GP can be configured by an integer multiple of a unit symbol allocated to a data zone.

In general, a length of a GP is designed by a round trip time (RTT) and RF switching time (from DL to UL/from UL to DL). Hence, the length of the GP can be determined by a method of minimizing overhead in consideration of RTT and RF switching time overhead (e.g., a self-contained frame structure).

If the frame structure shown in FIG. 8 corresponds to a frame structure allocated by a base station for a plurality of UEs, the base station operates in a full duplex scheme that performs UL/DL data transmission and reception at the same time in a data zone. On the contrary, The UEs operate in a half-duplex scheme that performs either transmission or reception only. Hence, it is necessary for the base station to transmit DL data and receive UL data at the same time. In this case, if GPs are configured according to a legacy method, as shown in FIG. 10, it is apparent that interference occurs due to the mismatch between symbol boundaries.

Figure 10:
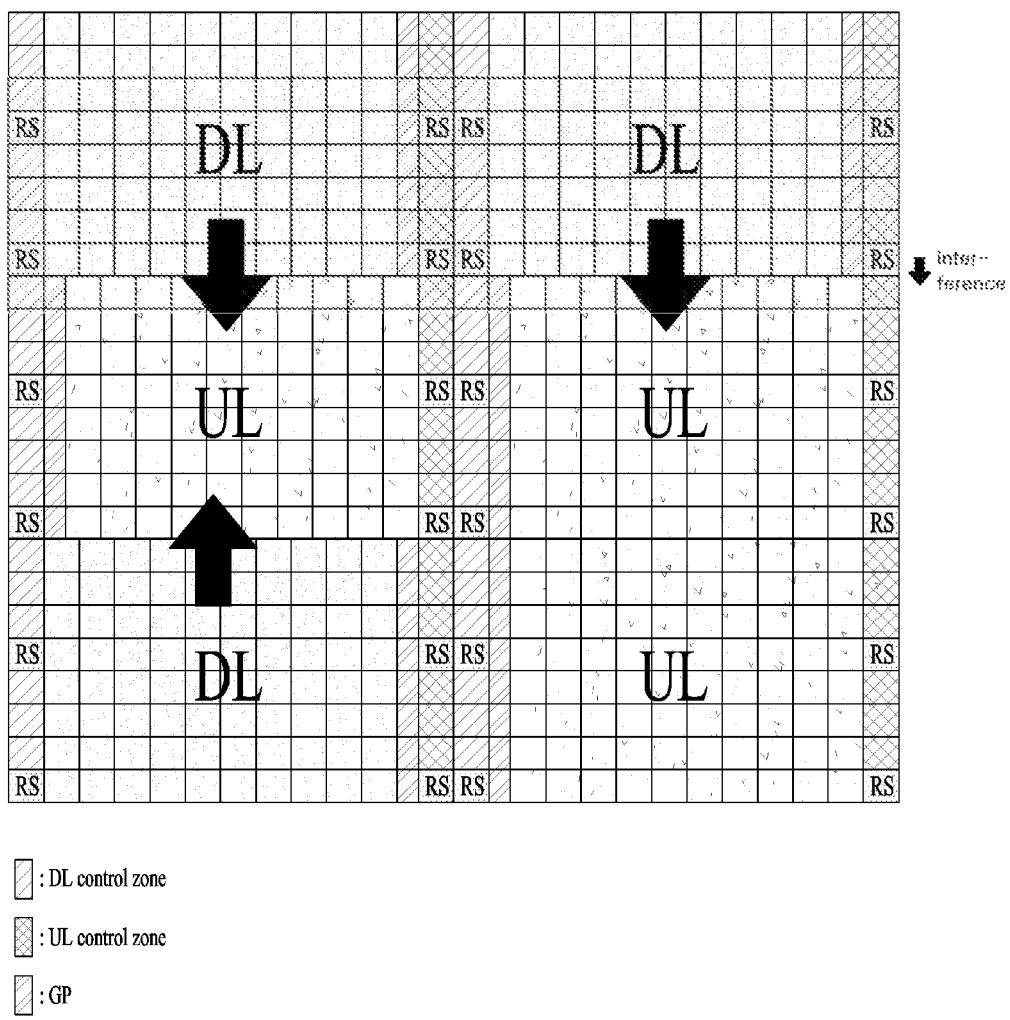
FIG. 10 is a diagram illustrating an example that a DL data symbol boundary is not matched with a UL data symbol boundary in a data zone in a base station.

FIG. 10 is a diagram illustrating an example that a DL data symbol boundary is not matched with a UL data symbol boundary in a data zone in a base station.

A base station receives data transmitted in DL within in-band. Hence, if a level of the mismatch is less than a CP length, it is able to receive UL data without interference on an ideal channel via orthogonality of OFDM. Yet, as shown in FIG. 10, a GP makes a symbol boundary between UL data and DL data to be mismatched. Hence, as shown in FIG. 8, it may be able to cancel the interference by configuring a GP length of a data zone by a symbol length.

In particular, the GP length of the data zone is configured to satisfy equation 1 in the following all the time by making the GP length to be an integer multiple of a length of a unit symbol that constructs the data zone.

$$\text{Length of data zone} \div \text{Number of symbols in data zone} = \text{Length of single symbol} = T\_cp + T\_u = \text{GP length} \div k \qquad \text{[Equation 1]}$$

In this case, k is a natural number, T_cp corresponds to a CP length, and T_u corresponds to a length of a data part in a symbol. In particular, a length of a GP becomes an integer multiple of a length of a unit symbol that constructs a data zone.

And, a DL control zone and a UL control zone can be configured by N number of symbols without being restricted to a single symbol.

The frame structure shown in FIG. 10 requires a transceiver configured to perform DL and UL (i.e., transmission and reception) at the same time in a DL zone. A structure of the transceiver can be configured as follows.

Figure 11:
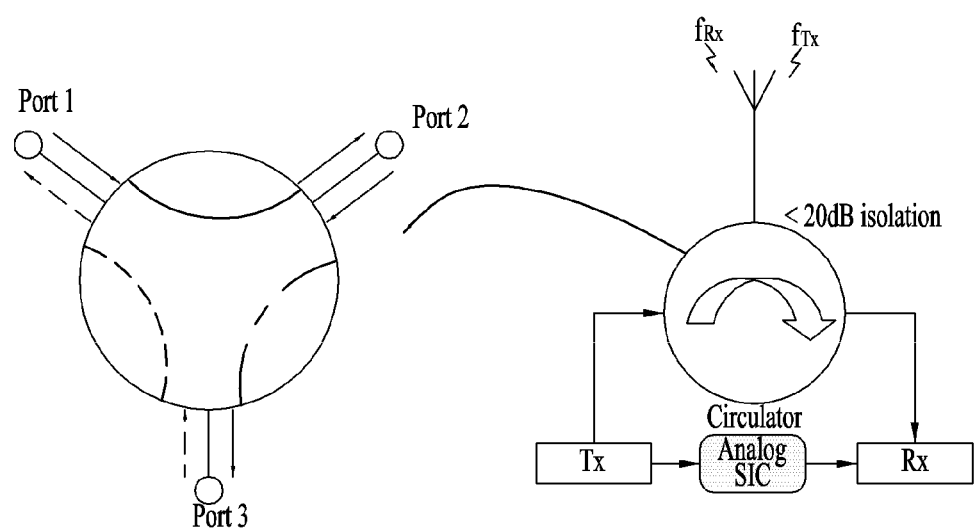
FIG. 11 is a diagram illustrating an example of an RF structure of a transceiver of a base station.

FIG. 11 is a diagram illustrating an example of an RF structure of a transceiver of a base station.

FIG. 11 illustrates configurations of devices for performing transmission and reception at the same time in a single carrier. First of all, in order to reduce power leakage that a signal transmitted by a base station is entering a receiving end, a signal is attenuated using a circulator. In addition, it may be able to additionally suppress a self-interference signal via an analog SIC device.

The frame structure proposed in the proposal 1 has the characteristic that transmission occasion of DL/UL traffic of FDD is always guaranteed in a legacy system. The frame structure can also efficiently use a resource according to asymmetry of DL/UL traffic of TDD.

In the following, a frame structure of a base station and a UE operating in a TDD or FDD mode is proposed.

Proposal 2-1

In a TDD carrier, a subframe is mainly divided into a DL control zone, a GP, a data zone, and a UL control zone. The DL control zone is located at the first of the subframe, the data zone is located right after the DL control zone, and the UL control zone is lastly located after the data zone. In this case, the data zone can be used as a DL data or a UL data in the subframe. And, a GP is located between the DL control zone and the data zone when data belonging to a corresponding band corresponds to UL. On the contrary, when data corresponds to DL data, a GP is located between the data zone and the UL control zone. The DL control zone and the UL control zone can be configured by 1 to N number of symbols. A GP is configured by an integer multiple of a symbol.

Figure 12:
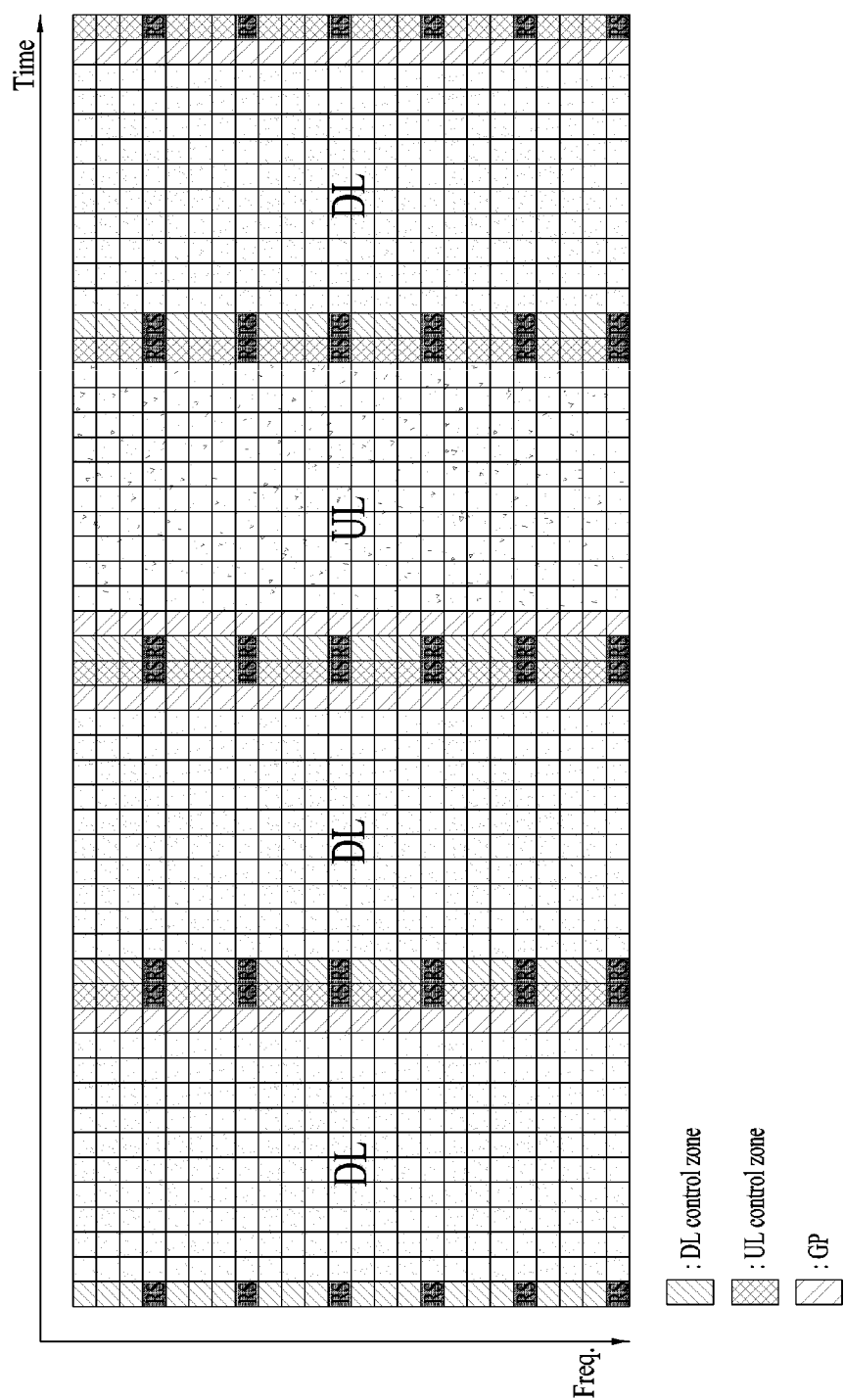
FIG. 12 is a diagram illustrating an example of a frame structure time-frequency resource on a TDD carrier.

FIG. 12 is a diagram illustrating an example of a frame structure time-frequency resource on a TDD carrier.

As shown in FIG. 12, a data zone of every subframe is allocated as a UL data zone or a DL data zone. Hence, DL/UL flexibility is lowered compared to the frame structure of the proposal 1. Yet, since the DL control zone and the UL control zone are still located within a single subframe, 'OTA (w/initiation) <1 ms' can be achieved by a scheduler. Moreover, since it is able to utilize the data zone as a DL data zone or a UL data zone by the scheduler, it is apparent that the frame structure is more DL/UL flexible compared to the legacy LTE TDD.

A length of a GP is configured by a multiple of a symbol length. This makes numerology (subcarrier spacing, CP length, symbol length, number of symbols in a TTI) used in TDD to be identically used in a FDD frame structure. In particular, it is a design method for providing commonality as much as possible in the TDD and FDD frame structures. As a result, it may be able to maintain a lot of common parts in a baseband operation.

For example, when a GP is designed by a length of half symbol without being maintained by the length of one symbol, if the same TTI is applied, the number of symbols or a CP length varies in TDD and FDD and it breaks unity in terms of an implementation device. As a result, it may implement TDD and FDD, respectively. On the contrary, if a GP length is maintained by a multiple of a symbol length, since it is able to commonly use a CP, a symbol length, and the like, it may have an advantage that a commonly used implementation part increases.

Proposal 2-2

Figure 13:
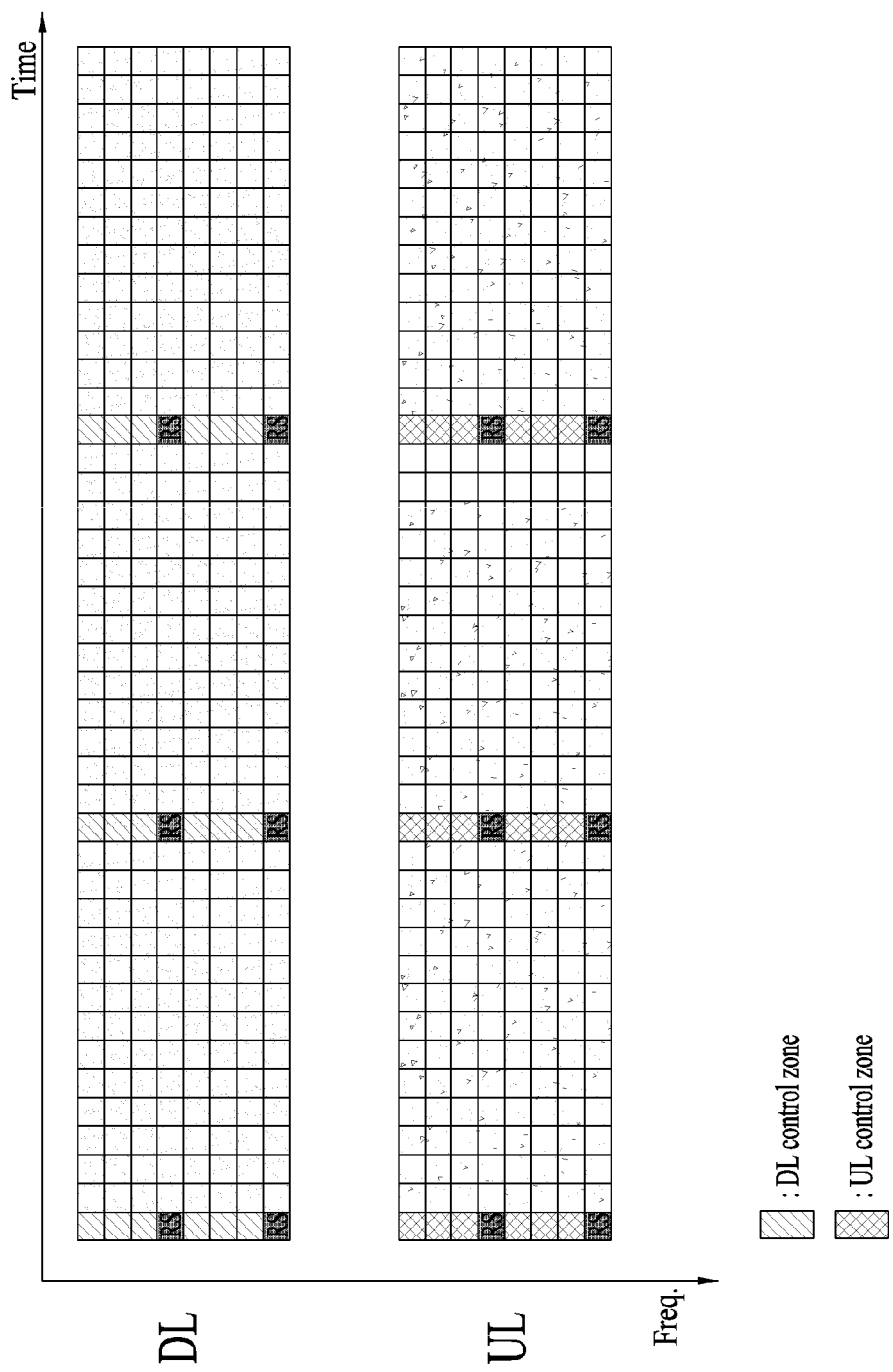
FIG. 13 is a diagram illustrating an example of a frame structure time-frequency resource on a FDD carrier.

FIG. 13 is a diagram illustrating an example of a frame structure time-frequency resource on a FDD carrier.

In FIG. 13, a subframe is mainly divided into a control zone and a data zone on a FDD carrier. In case of DL, the control zone is located at the first of the subframe and the data zone is located after the control zone. In case of UL, a UL control zone is located at the first of the subframe and the data zone is located after the UL control zone.

FIG. 13 illustrates a frame structure that a GP is utilized as a data and a control zone is located at the first part of a subframe in a legacy TDD frame structure. As mentioned in the foregoing description, commonality is maximized by maintaining a common part with the legacy TDD frame structure as much as possible.

As mentioned in the foregoing description, the frame structure according to the proposal provided by the present invention can achieve low latency (i.e., OTA (w/initiation) <1 ms) corresponding to 5G service requirement and provide DL/UL flexibility capable of efficiently supporting asymmetry of DL/UL traffic as much as possible.

In case of legacy LTE/LTE-A, as shown in FIG. 3, DL synchronization and transmission of essential system information can be performed via PSS, SSS or PBCH. On the contrary, a self-contained subframe structures, an adaptive/self-contained frame structure, and a TDD new frame structure considered in a next generation 5G system has no definition for broadcasting DL synchronization or system information. In particular, since the self-contained subframe structure and a new frame structure for 5G TDD system perform a TDD operation in an unfixed configuration, if a specific region for DL synchronization or system information is designated in a data zone, restriction of which DL operation is performed on the whole of frequency bands occurs. If the region for the definition is designated in a DL control zone (or a DL control channel), since a region within the control zone increases, it may cause the increase of control overhead and the decrease of system throughput. Hence, it is necessary to design a frame structure capable of transmitting a DL synchronization operation and system information of the self-contained frame structure for next generation 5G system. The present invention proposes a DL synchronization scheme and a system information transmission scheme appropriate for maintaining system throughput while DL/UL flexibility of the self-contained frame structure is not deteriorated.

The present invention proposes a DL synchronization scheme and a system information (hereinafter, SI) transmission scheme suitable for maintaining system throughput while DL/UL flexibility of the self-contained frame structure (Self-contained subframe structure and New frame structure for 5G TDD system) is not deteriorated. And, the present invention may also be identically applied to an adaptive/ self-contained frame structure and a new frame structure for 5G FDD system.

Proposal 3: Non-Hierarchical DL Synchronization and System Information Transmission Design conditions for DL synchronization and SI transmission in LTE/LTE-A system are described in the following.

① Minimize cell search time performance in presence of inter-cell interference and frequency offset ② Minimize UE complexity ③ Minimize Signaling Overhead On the contrary, a DL synchronization scheme and an SI transmission scheme of self-contained frame structure considered in the next generation 5G system additionally have design principles described in the following in addition to the aforementioned design conditions.

④ Define DL synchronization and broadcasting of SI applicable to the self-contained frame structure.

⑤ A region for DL synchronization or broadcasting of SI does not reduce DL/UL flexibility of data zone. -> (for this purpose, it is necessary that an SS (synchronization signal) is configured to a DL control zone.)

⑥ A region for DL synchronization or broadcasting of SI does not increase control overhead. -> (for this purpose, it is necessary that SI is distributed to a plurality of subframes.)

The present invention proposes a structure that a synchronization signal 1 (SS1), a synchronization signal 2 (SS2) for performing DL synchronization and system information (SI) for obtaining cell-specific system information are transmitted in a DL control zone to maintain DL/UL flexibility of self-contained frame structures. For convenience of explanation, among the self-contained frame structures, the TDD new frame structure proposed in the FIG. 12 is explained as an example. As mentioned in the foregoing description, the present invention can also be applied to a new frame structure of FDD scheme and a frame structure of a self-contained scheme without being restricted to new frame structure of TDD scheme.

Figure 14:
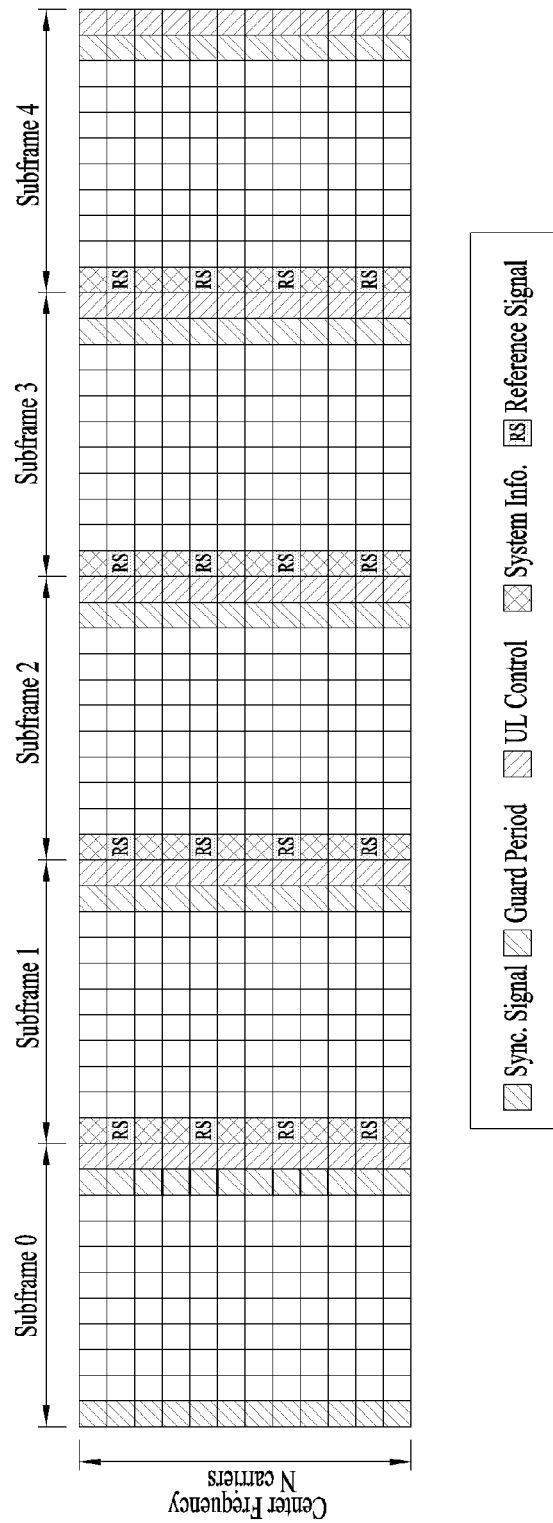
FIG. 14 is a diagram conceptually illustrating an SS/SI allocation region of a new frame structure of a TDD scheme proposed in the present invention.

FIG. 14 is a diagram conceptually illustrating an SS/SI allocation region of a new frame structure of a TDD scheme proposed in the present invention.

FIG. 14 illustrates a deployment concept of a synchronization signal 1 (SS1), a synchronization signal 2 (SS2), and system information (SI) in new frame structure of TDD scheme proposed in the present invention. As shown in FIG. 14, the first n number of symbols (e.g., n is equal to or greater than 1, preferably, the n may be specified by 1) is (are) configured as a DL control zone, and the last m number of symbols (e.g., m is equal to or greater than 1, preferably, the m can be specified by 1) is (are) configured as a UL control zone in the TDD new frame structure. The proposed new frame structure of TDD scheme performs TDD operation in an unfixed configuration. Hence, if a specific region for an SS (containing SS1 and SS2) or SI is designated in a data zone, a restriction of performing a DL operation on the whole of frequency bands occurs. Unlike the data zone, since a DL control zone is allocated by a DL zone only and a UL control zone is allocated by a UL zone only, it is able to transmit an SS or SI without deteriorating flexibility of the data zone.

Yet, if a region for an SS and SI is designated in the DL control zone, time axis extension of the DL control zone occurs according to sizes of the SS and the SI and it may cause system throughput loss due to the decrease of the data zone. Hence, if the region for the SS and the SI is configured by the first symbol of the DL control zone only, it may be able to minimize the throughput loss due to the decrease of the data zone.

For example, as shown in FIG. 14, an eNB may transmit the SS and the SI on N number of carriers of a center frequency corresponding to the minimum bandwidth determined by 5G system. In this case, the eNB may transmit an SS 1 in a first symbol corresponding to a DL control zone of a subframe 0 as a single symbol in a frame. In this case, the subframe 0 corresponds to a subframe of a lowest index in a frame and most preceding subframe in a frame in time domain. Yet, the SS may also be configured in a first symbol of a different subframe without being restricted to the very first subframe of a frame. An SS 2 may be transmitted in a first symbol corresponding to a DL control zone of a subframe 1 as a single symbol.

Referring to FIG. 14, the SI is transmitted in one symbol, that is, in the first symbol of each of subframes 1 to 4 corresponding to the DL control zone. In this case, the order and range of subframes in which the SS or SI is transmitted may vary depending on system environment. In addition, although FIG. 14 shows an example where the SI is continuously transmitted in four subframes, the SI may be transmitted in at least one subframe in one TDD frame. When the SI is transmitted in a plurality of subframes, the SI may be transmitted in a plurality of consecutive subframes as shown in FIG. 14, or it may be transmitted in a plurality of nonconsecutive subframes. Moreover, although FIG. 4 shows that the SI transmission starts from subframe 1 consecutive to the subframe where the SS is transmitted (subframe 0), this is merely an example, and the SI may be transmitted in a subframe, which appears after the subframe where the SS is transmitted but not consecutive thereto.

The SS is used for frame synchronization and composed of C sequences for cell search. A UE may obtain an index of a transmitted sequence through blind detection for the C sequences. In this case, C indicates a cell index. In general, from the perspective of sectorization, up to three cells can be identified, and it may be differently configured according to the system environment. When performing the blind detection for the sequences, the UE performs synchronization based on auto-correlation or cross-correlation. Additionally, after detecting the sequence, the UE may perform channel estimation based on a known sequence.

The SI can be distributedly transmitted in first symbols of a plurality of subframes. In this case, each SI symbol includes L reference signals (RSs). The L RSs are composed of L' sequences with low cross-correlation, and L' physical cell group identifiers (IDs) can be identified through blind detection based on auto/cross-correlation. Here, L and L' may vary according to the system environment. If L is greater than L', it may be composed of orthogonal sequences, and if L is smaller than L', it may be composed of non-orthogonal sequences. When the blind detection is performed for the L' sequences, coherent detection may be performed through channel estimation information in the SS, or non-coherent detection may be performed on the SI symbols independently.

Figure 15:
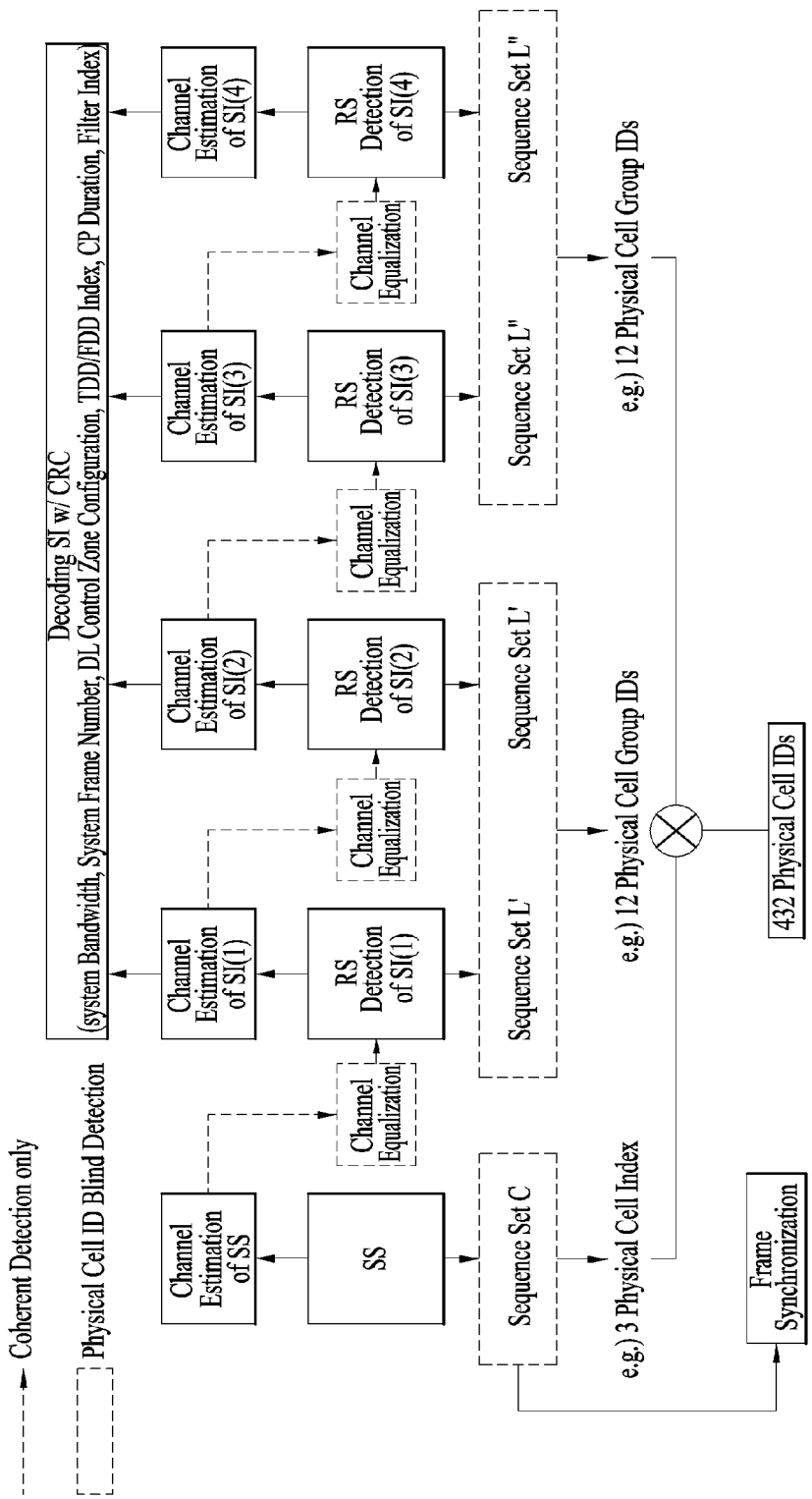
FIG. 15 is a diagram illustrating a synchronization procedure of an SS and a decoding procedure of an SI proposed in the present invention.

FIG. 15 is a diagram illustrating a synchronization procedure of an SS and a decoding procedure of an SI proposed in the present invention.

FIG. 15 illustrates an exemplary procedure for downlink synchronization and SI decoding based on the proposed TDD new frame structure. As illustrated in FIG. 14, a UE obtains frame synchronization through SS blind detection using the first symbol of subframe 0 and acquires a cell index (one of C) in a physical cell ID group. The UE performs channel estimation based on the cell index obtained from the detected SS. In the case of a coherent detection scheme, the UE performs channel equalization and then detects sequences applied to an RS of SI(1) corresponding to the first symbol of subframe 1. By doing so, the UE can identify L' sequences.

In the same way, the UE performs blind detection for sequences applied to an RS of SI(2) by performing channel estimation for the RS of SI(1) and channel equalization for SI(2). That is, the UE performs channel estimation and channel equalization as many as the total number of pieces of SI. In the case of a non-coherent detection scheme, the UE performs blind detection for sequences applied to an RS without channel equalization. If a channel significantly changes in the time domain, the non-coherent detection may show better performance.

In the above-described method, if a coherence bandwidth, which is formed by multipath fading, is greater than a subcarrier spacing, the RS may be allocated to the entire frequency region. In this case, the symbol where SI is transmitted may be different from the symbol where an RS for the SI is transmitted.

Unlike the legacy LTE/LTE-A system, the UE may perform the method described in FIG. 15 in the state that the UE does not know cyclic prefix (CP) duration and whether it is TDD or FDD. Since a DL control zone starts at the first symbol of each subframe in the adaptive/self-contained frame structure, TDD new frame structure, and FDD new frame structure, the structures are advantageous in that a UE can obtain downlink synchronization and perform SI decoding even when the UE does not know the CP duration and whether it is the TDD or FDD. A method for identifying a physical cell ID (PCID) through sequences used for an RS in an SI symbol may vary according to hierarchical sequence sets. For example, assuming that sequence set C, which is identified by the SS, distinguishes between three cell indices, sequence set L' identifies twelve physical cell group IDs through SI(1) and SI(2), and sequence set L' identifies twelve physical cell group IDs through SI(3) and SI(4), a UE can identify 432 physical cell IDs (3*12*12=432). If all SI symbols have different sequence sets, the UE can identify 3*12*12*12*12 physical cell IDs. If all SI symbols have the same sequence sets, the UE can identify 3*12 physical cell IDs. In a plurality of subframes, sequence sets may be all the same or different, or each of them may be composed of subsets. Since as the number of sequence sets for the RS increases, the number of physical cell IDs increases, detection complexity increases and detection accuracy decreases. On the contrary, since as the number of sequence sets for the RS decreases, the number of physical cell IDs decreases, the detection complexity decreases and the detection accuracy increases. The above methods may be defined in advance according to systems. Using the above-described method, a UE can identify a physical cell ID, perform SI decoding after completing channel estimation, and check whether the SI decoding is successful through cyclic redundancy check (CRC).

In the above method, when the symbol where SI is transmitted is different from that where an RS for the SI is transmitted, SI decoding may be impossible unless the CP duration is known. In this case, the decoding can be performed through blind detection for the CP duration.

The above-described SI can be distributedly transmitted in a plurality of subframes and include a plurality of pieces of essential information necessary for UE's initial access. In this case, the plurality of pieces of essential information necessary for the UE's initial access may vary according to the system environment. In general, the information may include system bandwidth, system frame number, DL control zone configuration information, TDD/FDD index, CP duration, CRC, etc. Here, the DL control zone configuration information may include length information of control information in the DL control zone or arrangement information thereof. For example, it may include index information informing a location or size of a region for physical hybrid-ARQ indicator information (e.g., a location or size of a PHICH) and the like. In addition, in the legacy LTE/LTE-A system, a UE can detect a TDD/FDD index and CP duration through hierarchical synchronization. However, the information cannot be detected through the non-hierarchical SS proposed in the present invention. Thus, when transmitting the SI, a base station (BS) needs to include resources allocated for the information in the SI. That is, when transmitting the SI, the BS may include, in the SI, 1-bit information indicating whether a corresponding frame is either a TDD frame or FDD frame. In the case of CP-OFDM, if there are two types of CPs, 1-bit information informing the CP duration is also included in the SI. Moreover, when filtered OFDM corresponding to a new waveform is used, if there are two types of filters, additional 1-bit information indicating a filter index may be further included in the SI. Although 1-bit information is taken as the example, the number of bits may be increased according to types of predefined methods.

In the above method, when the symbol where the SI is transmitted is different from that where the RS for the SI is transmitted, since the blind detection for the CP duration is performed, information bits for informing the CP duration may be dropped.

Figure 16:
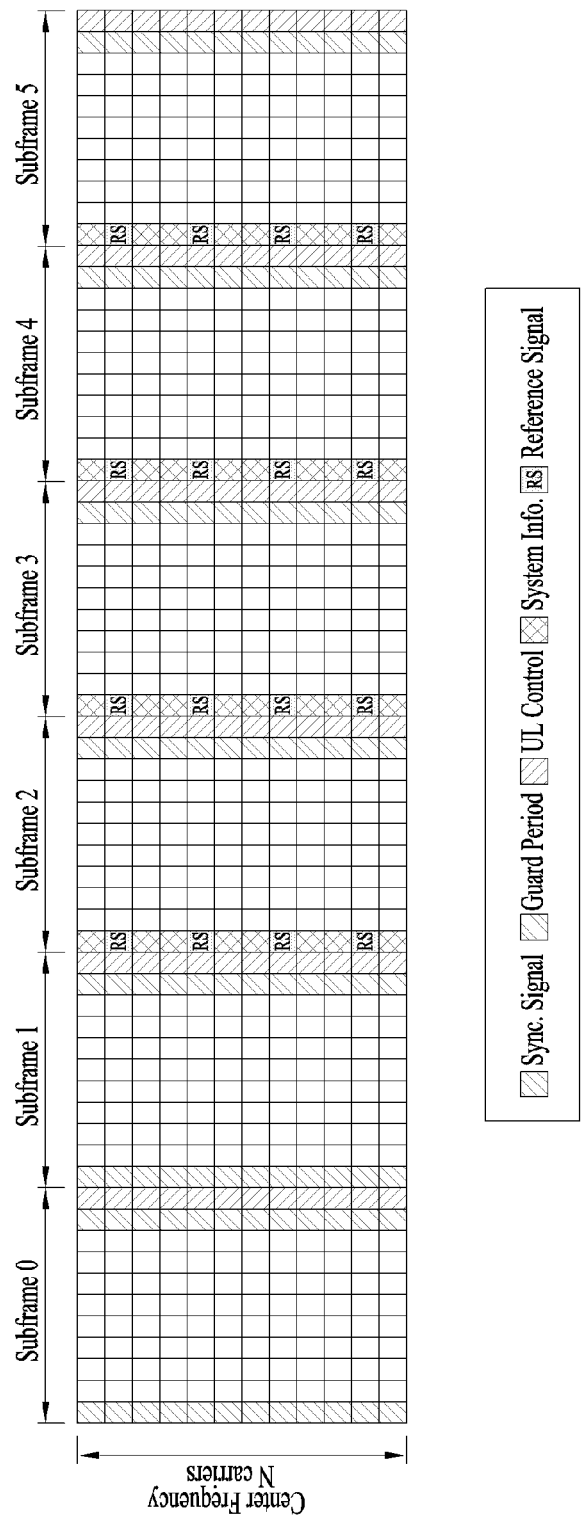
FIG. 16 is a diagram illustrating exemplary SS and SI allocation in the TDD new frame structure proposed in the present invention.

FIG. 16 is a diagram illustrating exemplary SS and SI allocation in the TDD new frame structure proposed in the present invention FIG. 16 illustrates a case in which the proposed TDD new frame structure has a plurality of SSs. In the next-generation 5G system, each service scenario may have different requirements for initial synchronization time. In this case, if frequency of the SS in a single frame is increased, synchronization may be accumulated quickly so that symbol timing can be obtained. However, when a plurality of SSs are periodically transmitted in one frame, there occurs a problem that a start point of the frame cannot be recognized. Therefore, the SSs are continuously arranged starting from the first subframe in the single frame. For example, when there are two SSs and four pieces of SI in one frame, transmission may be continuously performed from subframe 0 to subframe 5 in the following order: [SS, SS, SI(1), SI(2), SI(3), SI(4)]. In this case, a BS may repeatedly transmit the SS by applying the same sequence, and in the case of SI, a bundle of information of the SI is distributed and transmitted from SI(1) to SI(4). A UE may perform frame synchronization with respect to the first SS (i.e., SS in subframe 0 of FIG. 15). Although FIG. 15 shows that the repetition frequency of the SS is two and the number of times of distributed SI transmission is four, the repetition frequency of the SS and the number of times of distributed SI transmission may vary according to 5G system scenarios.

The above-described SS and SI transmission structure can be summarized as follows.

(1) The SS or SI may be transmitted only in the DL control zone. Specifically, the SS or SI can be transmitted on N carriers corresponding to the center frequency and in the first symbol of each subframe.

A. Since the system bandwidth is unable to be checked, the SS may be transmitted on the N carriers corresponding to the center frequency.

B. In the TDD new frame structure, since the first symbol is used as the DL control zone over the entire band, it may be transmitted only in the first symbol of each subframe.

C. In this case, if an RS for the DL control zone should be located at the first symbol, the SS and SI may be located at the second symbol. In this case, the SS and SI should be located at the first symbol among control symbols except the RS and need to be transmitted in one symbol at the same position in each subframe.

D. Thus, in the TDD new frame structure, the SS and SI are transmitted only in the first symbol of each DL control zone. If the size of the SI is over one symbol, it is distributedly transmitted in the first symbol of the DL control zone of each of a plurality of subframes.

(2) The SS is composed of C sequences and in charge of performing, through blind detection based on auto/cross-correlation, functions such as frame synchronization, C-cell search, and channel estimation based on the detected sequence.

A. The UE may perform the blind detection for the SS sequences, perform the channel estimation based on the detected sequences for the received SS in a least square manner, perform channel equalization on REs where an RS of SI existing in a neighboring subframe is mapped, and then detect a physical cell group ID through the blind detection for the RS of the SI.

B. That is, the channel estimation through the SS may be performed for coherent detection for the RS of the neighboring SI.

(3) The SI in a single subframe includes L RSs and each RS is composed of L' sequences with low cross-autocorrelation. Through the blind detection based on auto/cross-correlation, L' physical cell group IDs are identified. In addition, the UE may perform the channel estimation based on the physical cell group ID.

A. A UE may detect sequences through the blind detection for the RS of the SI, perform the channel estimation based on the detected sequences for the received SS in a least square manner, and then perform the channel equalization on the REs where the RS of the SI existing in the neighboring subframe is mapped. Thereafter, the UE may detect the physical cell group ID through the blind detection for the RS of the SI.

B. That is, the UE may perform the channel estimation through the RS of the SI for the coherent detection for the RS of another neighboring SI.

(4) If the number of RSs in each SI symbol, L is equal to the number of sequences, L', an orthogonal sequence may be used. In the case of L<L', a non-orthogonal sequence set with low cross-correlation may be used.

(5) To detect sequences used for RSs in each SI symbol, channel equalization may be performed based on channel estimation information of the previous subframe so that the sequences for the RSs may be detected in a coherent manner.

(6) The RS values of each SI symbol are determined by a sequence set. In a plurality of subframes, sequence sets may be all the same or different, or each of them may be composed of subsets.

(7) The SI carries essential information necessary for UE's initial access. The necessary information may include system bandwidth, system frame number, DL control zone configuration information, TDD/FDD index, CP duration (for CP-OFDM), filter index (for filtered OFDM), etc. In addition, if the SI includes CRC, the UE checks whether decoding is successful by encoding the CRC.

(8) A plurality of pieces of divided SI may be converted into a bundle, and then decoding may be performed thereon. Whether the decoding is successful may be checked by CRC.

(9) In a single frame, the SS may be repeatedly and continuously transmitted from the first subframe according to the frequency of the SS. The SI may be distributedly transmitted from a subframe appearing after the subframe where the last SS is transmitted according to the information amount of the SI. A UE may perform frame synchronization with respect to the first SS and perform SI decoding based on the frame synchronization.

Figure 17:
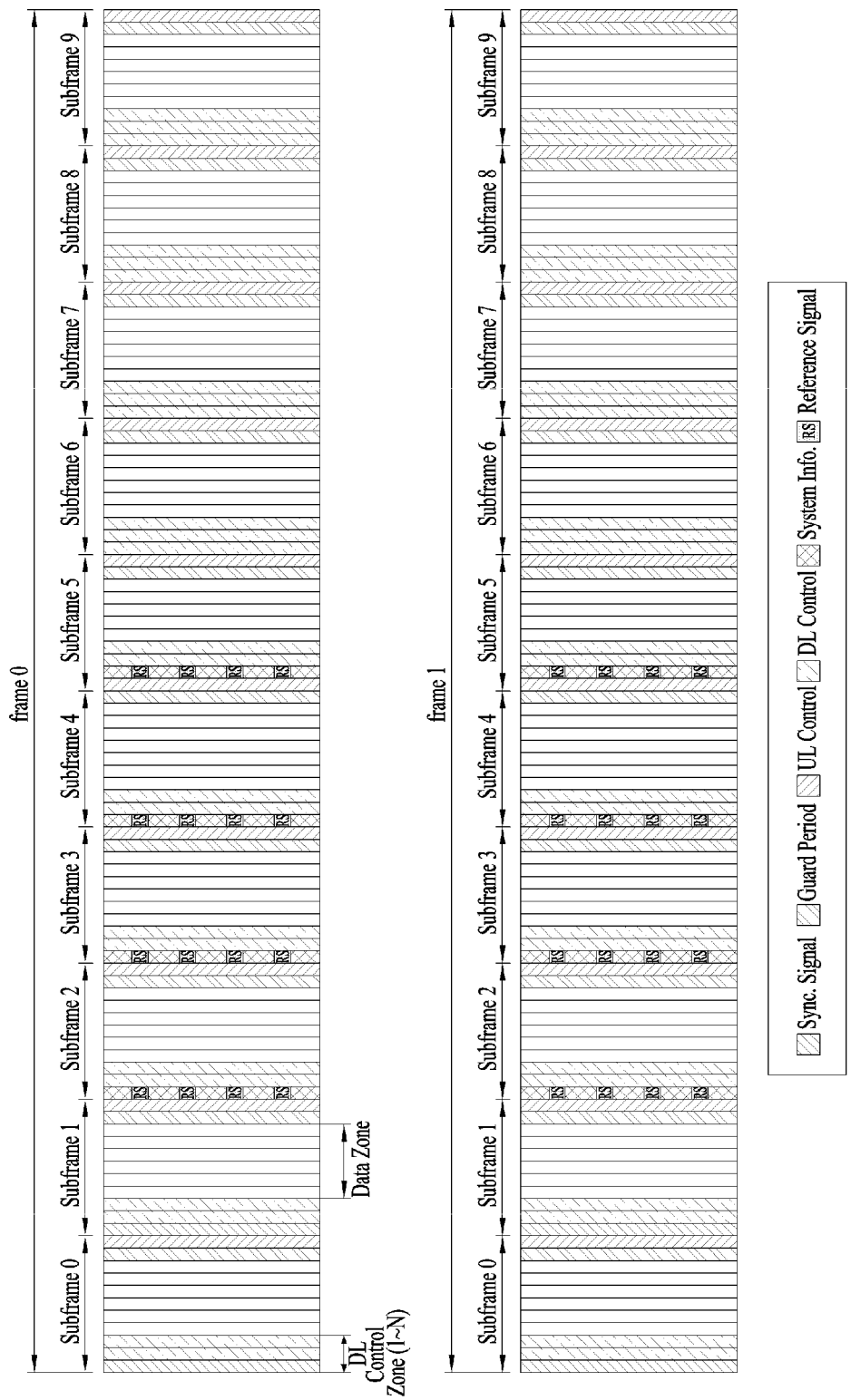
FIG. 17 is a diagram illustrating an exemplary system where one piece of SI and two SSs are transmitted in one frame based on the TDD new frame structure proposed in the present invention.

FIG. 17 is a diagram illustrating an exemplary system where one piece of SI and two SSs are transmitted in one frame based on the TDD new frame structure proposed in the present invention.

FIG. 17 illustrates an example of transmitting two SSs and a single piece of SI in one frame regarding the SS and SI transmission method. For example, in the legacy LTE/LTE-A system, the SI is transmitted on a PBCH, and for the PBCH transmission, 288 REs are configured using 72 subcarriers and 4 symbols including an RS.

In the TDD new frame structure, if the same amount of information needs to be transmitted, 288 REs may be configured and transmitted using 72 subcarriers and 4 symbols. In this case, the SI may be distributedly transmitted over four subframes, that is, using the first symbol of the DL control zone four times, and the SI in the four symbols may be configured as a single piece of SI. Here, the SI in the four symbols is merely an example, and the SI may be configured in at least one symbol. Thus, the SS may be repeatedly transmitted in first symbols of DL control zones of subframe 0 and subframe 1 in each frame, and the SI may be distributedly transmitted in first symbols of DL control zones of subframe 2, subframe 3, subframe 4, and subframe 5. In this case, assuming that the subframe is set to 0.2 ms, the SS is repeatedly transmitted two times every 2 ms. Assuming that in the worst case, synchronization is completed at a receiving end after the SS is accumulated ten times, the synchronization may be performed in 10 ms.

The transmission frequency of the SS and SI illustrated in FIG. 17 may vary according system environment. For example, if the frequency is reduced by half due to relaxing of synchronization requirements of the system, the SS and SI may be transmitted in frames 0, 2, 4, . . . in the same manner, and DL control information may be transmitted in frames 1, 3, 5, . . . . In this case, assuming that the subframe is set to 0.2 ms, the SS is repeatedly transmitted two times every 2 ms. Assuming that in the worst case, synchronization is completed at a receiving end after the SS is accumulated ten times, the synchronization may be performed in 10 ms.

Figure 18:
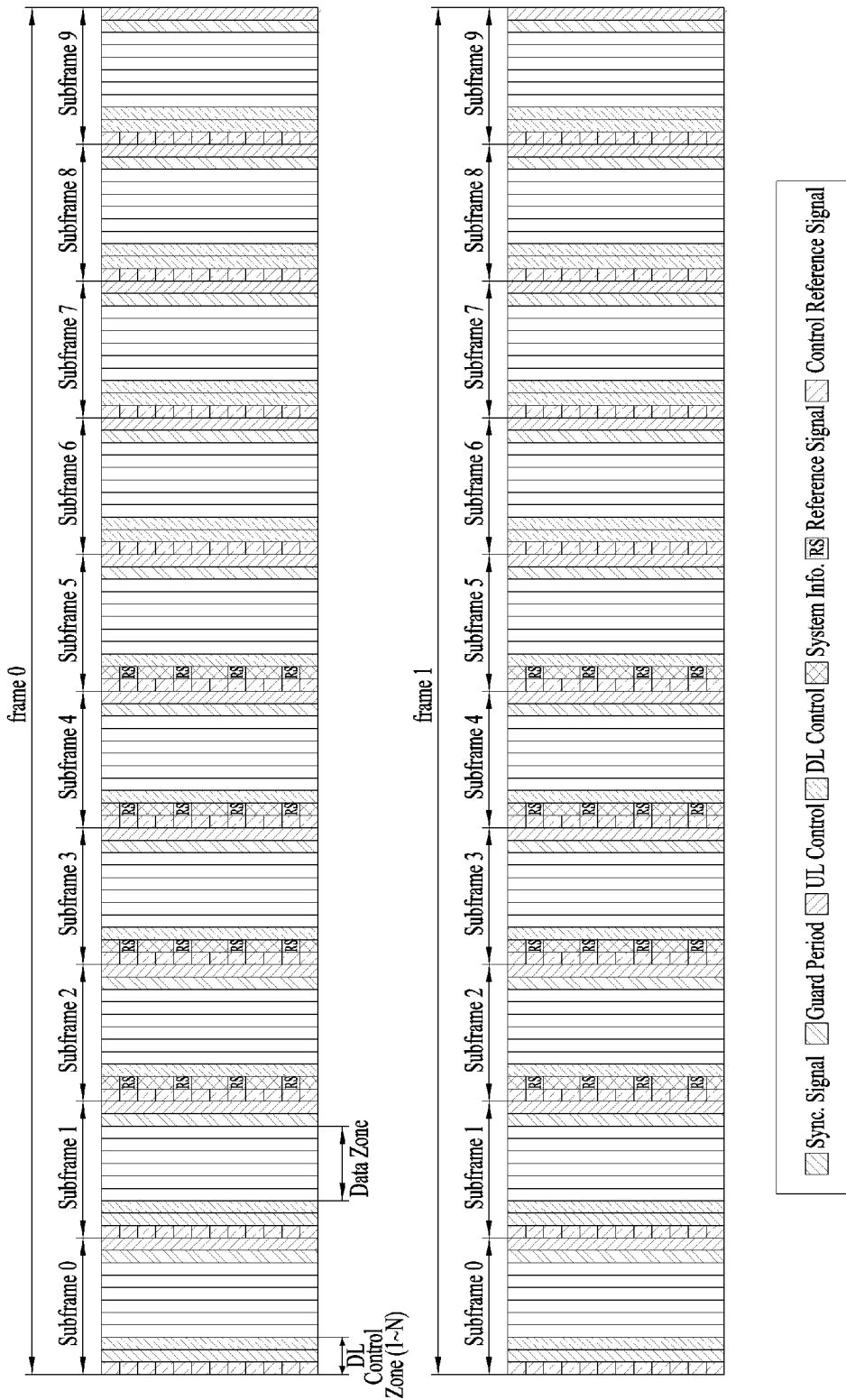
FIG. 18 is a diagram illustrating an exemplary SS and SI transmission method when an RS for a control zone should be located at the first symbol in the system where one piece of SI and two SSs are transmitted in one frame based on the TDD new frame structure proposed in the present invention.

FIG. 18 is a diagram illustrating an exemplary SS and SI transmission method when an RS for a control zone should be located at the first symbol in the system where one piece of SI and two SSs are transmitted in one frame based on the TDD new frame structure proposed in the present invention.

FIG. 18 illustrates a case in which the RS for the control zone should be located at the first symbol in the system where one piece of SI and two SSs are transmitted in one frame. In this case, the SS and SI may be transmitted in the first symbol in the DL control zone except a control RS. Thus, the SS and SI may be transmitted in the second symbol of each subframe. However, positions of the SS and SI may be the same within subframes, and the SS and SI may be transmitted in one symbol.

As described above, the downlink synchronization and SI transmission method based on the TDD new frame structure proposed in the present invention is advantageous in that system throughput loss can be minimized without deterioration of DL/UL flexibility of the self-contained frame structure.

The above-described embodiments correspond to combinations of elements and features of the present invention in prescribed forms. And, the respective elements or features may be considered as selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

A method performed by a UE for performing communication using a TDD frame in a wireless communication system can be industrially applied to various wireless communication systems including the 3GPP LTE/LTE-A system, 5G system, and the like

What is claimed is:

1. A method for performing communication using a time division duplex (TDD) frame by a user equipment (UE) in a wireless communication system, the method comprising:
receiving a synchronization signal (SS) in a starting symbol of a first time interval of the TDD frame including a plurality of time intervals, wherein each of the plurality of time intervals comprises, in sequence, a downlink control zone, a data zone, a guard period and an uplink control zone, and each starting symbol of all time intervals is included in the downlink control zone, and each last symbol of all time intervals is included in the uplink control zone;
receiving, on two or more symbols, two or more signals including system information (SI) and a reference signal (RS) for the SI, wherein each of the two or more symbols is a starting symbol of a corresponding time interval among two or more time intervals subsequent to the first time interval;
obtaining a cell ID based on both the SS and the RS for the SI; and
decoding the SI based on both the cell ID and the RS.

2. The method of claim 1, further comprising:
receiving downlink control information in at least one start symbol excluding the starting symbol of the first time interval, wherein the at least one start symbol of the first time interval is included in the downlink control zone of the first time interval.

3. The method of claim 1, wherein a symbol in front of the uplink control zone is configured as the guard period.

4. The method of claim 1, wherein the first time interval is a most preceding subframe of the TDD frame in a time domain.

5. The method of claim 1, wherein when downlink control information is received in a first symbol of the first time interval, the SS is received in a second symbol of the first time interval.

6. The method of claim 1, further comprising:
performing channel estimation based on the SS;
performing channel equalization based on the channel estimation; and
blindly decoding sequences applied to the RS,
wherein the cell ID is obtained based on both the SS and the blindly decoded sequences applied to the RS, and the SI is decoded based on both the cell ID and the blindly decoded sequences applied to the RS.

7. The method of claim 1, wherein the two or more time intervals subsequent to the first time interval comprise four consecutive time intervals.

8. The method of claim 1, further comprising:
receiving the SS in one symbol of a second time interval.

9. The method of claim 8, wherein the second time interval is a time interval subsequent to the first time interval in a time domain.

10. A user equipment (UE) for performing communication using a time division duplex (TDD) frame in a wireless communication system, the UE comprising:
a transceiver coupled to a processor; and
the processor configured to:
receive a synchronization signal (SS) in a starting symbol of a first time interval of the TDD frame including a plurality of time intervals, wherein each of the plurality of time intervals comprises, in sequence, a downlink control zone, a data zone, a guard period and an uplink control zone, and each starting symbol of all time intervals is included in the downlink control zone, and each last symbol of all time intervals is included in the uplink control zone,
receive, on two or more symbols, two or more signals including system information (SI) and a reference signal (RS) for the SI, wherein each of the two or more symbols is a starting symbol of a corresponding time interval among two or more time intervals subsequent to the first time interval,
obtain a cell ID based both on the SS and the RS for the SI, and
decode the SI based on both the cell ID and the RS.

11. The UE of claim 10, wherein the processor is further configured to receive downlink control information in at least one start symbol excluding the starting symbol of the first time interval, and
wherein at least one start symbol of the first time interval is included in the downlink control zone of the first time interval.

* * * * *